US008616884B1

(12) United States Patent
Lechner et al.

(10) Patent No.: US 8,616,884 B1
(45) Date of Patent: Dec. 31, 2013

(54) INTEGRATED LIVE AND SIMULATION ENVIRONMENT SYSTEM FOR AN AIRCRAFT

(75) Inventors: Robert James Lechner, St. Charles, MO (US); Timothy Stumpf, Foristell, MO (US); John Wokurka, Fenton, MO (US); Kenneth Leonard Bernier, O'Fallon, MO (US); Ryan Greene, St. Peters, MO (US); Chad Michael Keller, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/304,514

(22) Filed: Nov. 25, 2011

Related U.S. Application Data

(63) Continuation-in-part of application No. 12/628,831, filed on Dec. 1, 2009.

(51) Int. Cl.
*G09B 9/08* (2006.01)

(52) U.S. Cl.
USPC .............................................. 434/35; 434/66

(58) Field of Classification Search
USPC .................. 434/1–71, 219; 703/8; 73/118.03; 244/220
See application file for complete search history.

(56) References Cited

U.S. PATENT DOCUMENTS

| 4,442,491 A * | 4/1984 | Olhausen, Jr. ................ 701/505 |
| 4,599,070 A | 7/1986 | Hladky et al. |
| 5,807,109 A * | 9/1998 | Tzidon et al. .................... 434/35 |
| 7,098,913 B1 | 8/2006 | Etherington et al. |
| 2003/0046396 A1 | 3/2003 | Richter et al. |
| 2006/0178758 A1 | 8/2006 | Koriat |
| 2007/0264617 A1 | 11/2007 | Richardson et al. |
| 2010/0013927 A1 * | 1/2010 | Nixon ........................... 348/144 |
| 2011/0171611 A1 | 7/2011 | Batcheller et al. |
| 2011/0313658 A1 | 12/2011 | He |
| 2012/0156653 A1 | 6/2012 | Wokurka |
| 2012/0204059 A1 * | 8/2012 | Preston .......................... 714/10 |

FOREIGN PATENT DOCUMENTS

| JP | H08276074 A | 10/1996 |
| WO | 2012082242 A2 | 6/2012 |

OTHER PUBLICATIONS

Lechner et al. "Integrated Live Constructive Technologies Applied to Tactical Aviation Training," Interservice/Industry Training Simulation and Education Conference (I/TSEC), Paper No. 8147, Dec. 2008, pp. 1-11.
U.S. Appl. No. 12/628,831, dated Dec. 1, 2009, pp. 62.
U.S. Appl. No. 12/880,701, dated Sep. 13, 2010, pp. 79.
U.S. Appl. No. 12/968,494, dated Dec. 15, 2010, pp. 88.
Final Office Action, dated Oct. 25, 2012, regarding U.S. Appl. No. 12/628,831 11 pages.
Office Action, dated Aug. 30, 2012, regarding U.S. Appl. No. 12/880,701, 13 pages.

(Continued)

*Primary Examiner* — Timothy A Musselman
(74) *Attorney, Agent, or Firm* — Yee & Associates, P.C.

(57) ABSTRACT

A method and apparatus for training in an aircraft. A display system is associated with an aircraft. A sensor system is associated with the aircraft. A training processor is configured to be connected to the aircraft. The training processor is configured generate constructive data for a number of simulation objects and generate simulation sensor data using the constructive data. The training processor is further configured to present the simulation sensor data with live sensor data generated by the sensor system for an aircraft on a display system in the aircraft.

18 Claims, 16 Drawing Sheets

(56) References Cited

OTHER PUBLICATIONS

Office Action, dated Aug. 31, 2012, regarding U.S. Appl. No. 12/968,494, 11 pages.
USPTO Office Action dated Apr. 5, 2012 regarding U.S. Appl. No. 12/628,831, 13 pages.
Response to Office Action dated Jul. 5, 2012 regarding U.S. Appl. No. 12/628,831, 12 pages.
Office Action, dated Jun. 6, 2013, regarding USPTO U.S. Appl. No. 12/628,831, 9 pages.
Notice of Allowance, dated Aug. 20, 2013, regarding USPTO U.S. Appl. No. 12/968,494, 22 pages.
International Search Report and Written Opinion, dated Aug. 12, 2013, regarding Application No. PCT/US2011/058527, 9 pages.

* cited by examiner

INTEGRATED LIVE AND SIMULATION ENVIRONMENT SYSTEM FOR AN AIRCRAFT

CROSS-REFERENCE TO RELATED APPLICATION

This application is a continuation-in-part of patent application U.S. Ser. No. 12/628,831, filed Dec. 1, 2009, entitled "Integrated Live and Simulation Environment System for an Aircraft", which is incorporated herein by reference.

BACKGROUND INFORMATION

1. Field

The present disclosure relates generally to aircraft and, in particular, to a method and apparatus for performing training exercises in an aircraft. Still more particularly, the present disclosure relates to a method and apparatus for performing training exercises in an aircraft in which a live environment and a simulation environment are present.

2. Background

Training exercises are often performed for military aircraft. These training exercises are used to teach pilots how to operate the aircraft. Additionally, the exercises are also used to train the pilots on different strategies and tactics with respect to operating the aircraft. For example, pilots may train in an aircraft to improve skills and reactions to adversarial events. These events may include, for example, without limitation, encountering enemy aircraft, reacting to a presence of surface-to-air missile sites, engaging time sensitive targets, and other suitable events.

A large amount of training may be performed using training devices on the ground. These training devices often take the form of flight simulators. A flight simulator is a system that copies or simulates the experience of flying an aircraft. A flight simulator is meant to make the experience as real as possible. Flight simulators may range from controls and a display in a room to a full-size replica of a cockpit mounted on actuators that are configured to move the cockpit in response to actions taken by a pilot. These types of simulators provide a capability to teach pilots and/or other crew members to operate various aircraft systems and to react to different events.

Additional training is performed through training exercises using live aircraft. These types of training exercises expose pilots to the actual conditions encountered when flying an aircraft. Various conditions cannot be accurately simulated using a flight simulator. For example, the actual movement or forces encountered in flying an aircraft may not be adequately provided through a flight simulator.

With military aircraft, this type of training is typically performed on various areas or ranges. This type of training may involve using multiple live aircraft to perform training on encountering enemy aircraft. Further, various ground platforms also may be used. These ground platforms may include, for example, without limitation, tanks, surface-to-air missile systems, and other suitable ground units. These types of training exercises provide a pilot with the additional experience needed to operate an aircraft in different conditions.

Live training exercises are difficult and/or expensive to set up and operate. For example, to perform a training exercise in the air, airspace is restricted to other aircraft to avoid unintended incursions into the airspace in which the training occurs. Additionally, fuel, maintenance, and other expenses are required to prepare the aircraft for the exercises, operate the aircraft during the exercises, and perform maintenance after the exercises have concluded.

Further, the amount of airspace may be confining and may restrict the type and amount of movement that aircraft can make during a training exercise. Times and locations where airspace can be restricted may limit the amount of time when training exercises can be performed.

Therefore, it would be desirable to have a method and apparatus that takes into account one or more of the issues discussed above as well as possibly other issues.

SUMMARY

In one illustrative embodiment, an apparatus comprises an aircraft, a display system associated with the aircraft, a sensor system associated with the aircraft, and a training processor. The training processor is configured to be connected to the aircraft. The training processor is further configured to generate constructive data for a number of simulation objects and generate simulation sensor data using the constructive data. The training processor is further configured to present the simulation sensor data with live sensor data generated by the sensor system on the display system.

In another illustrative embodiment, a training system comprises a training processor configured to be connected to an aircraft. The training processor is configured to generate constructive data for a number of simulation objects and generate simulation sensor data using the constructive data. The training processor is further configured to present the simulation sensor data with live sensor data generated by a sensor system for the aircraft on a display system in the aircraft.

In still another illustrative embodiment, a method for training in an aircraft is present. A training processor generates constructive data. The training processor generates simulation sensor data using the constructive data. The simulation sensor data is presented with live sensor data generated by a sensor system for the aircraft on a display system in the aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and descriptions thereof will best be understood by reference to the following detailed description of an illustrative embodiment of the present disclosure when read in conjunction with the accompanying drawings, wherein:

DETAILED DESCRIPTION

Figure 1:
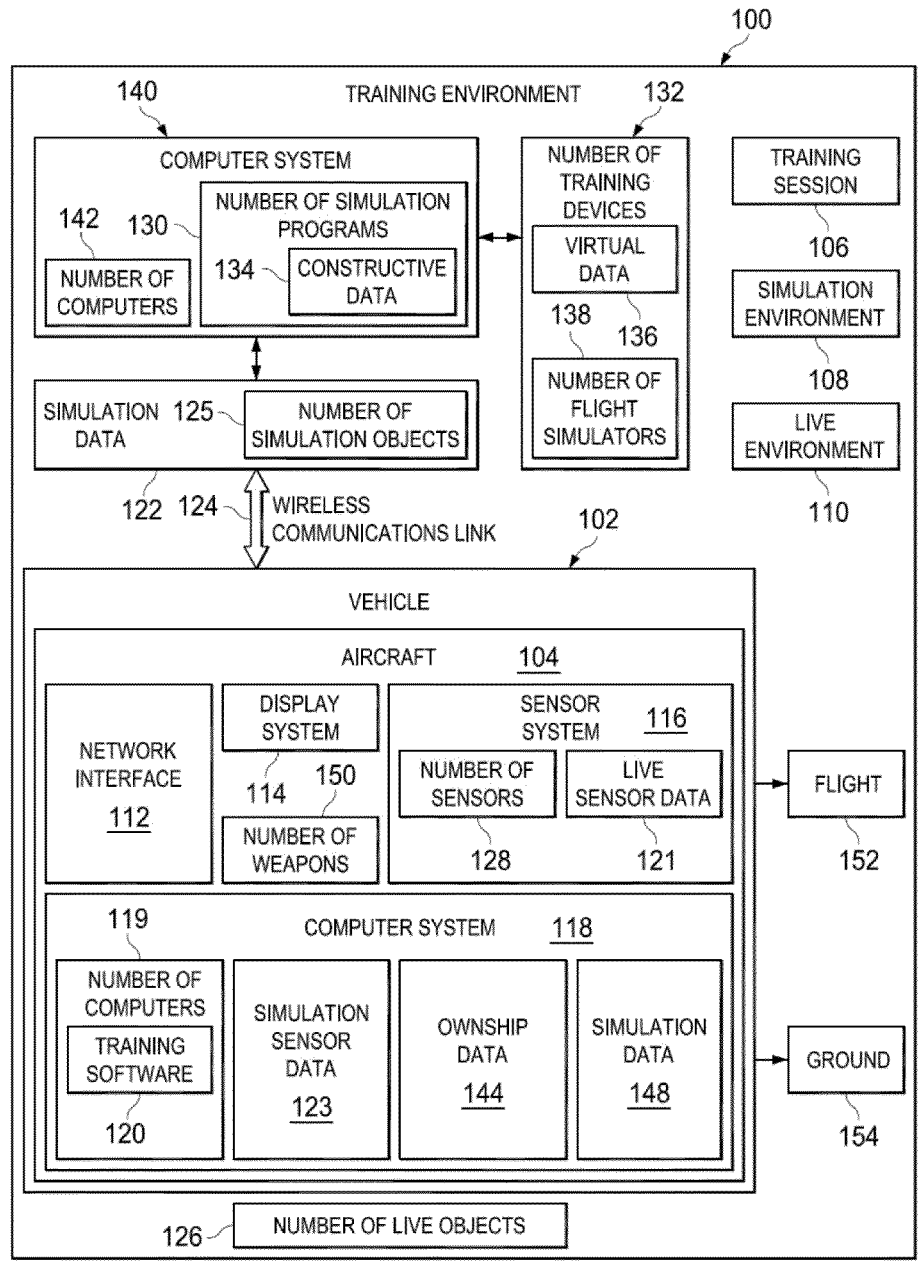
FIG. 1 is an illustration of a block diagram of a training environment in accordance with an illustrative embodiment.

The different illustrative embodiments recognize and take into account a number of considerations. For example, the different illustrative embodiments recognize and take into account that one manner in which training may be performed to reduce the expense and cost involves attaching pods or associating systems with the aircraft that simulate live platforms. These pods may include the hardware and software to simulate the platforms that the pilot may target or interact with.

This type of training simulates weapons that allow aircraft to target live platforms with onboard sensors. These pods also allow weapons to be shot through simulations embedded in the pods. The different illustrative embodiments recognize and take into account that this current type of simulation uses actual hardware or hardware emulations. A hardware emulation is hardware that takes a different form or type from the hardware actually used. A hardware emulation is configured to provide the same response or output as the actual hardware that is being emulated.

Although these types of systems may be useful, the different illustrative embodiments recognize and take into account that the hardware used for this type of simulation may have an undesired level of expense and maintenance.

Thus, the different illustrative embodiments provide a method and apparatus for integrating both live and simulation environments on an aircraft. The different illustrative embodiments provide a pilot and other crew members the capability to train in an actual training environment. This training environment includes both live and simulation objects. Data for the simulation objects is transmitted from other vehicles in the air or on the ground. In one illustrative embodiment, an apparatus comprises an aircraft, a network interface, a display system, a sensor system, and a computer system.

The network interface is configured to exchange data with a number of remote locations using a wireless communications link. The computer system is configured to run a number of processes to receive simulation data received through the network interface over the wireless communications link. The computer system is also configured to run a number of processes to receive live data from the sensor system. The computer system is configured to run a number of processes to present the simulation data with the live data on the display system in the aircraft.

In the different illustrative examples, the simulation data received from the network interface is processed to generate simulation sensor data. This simulation sensor data has the same format as sensor data generated by the sensor system associated with the aircraft. The simulation sensor data is processed by a number of processes running on the computer system to generate the sensor data. In these examples, the processes may take the form of a number of models for the different sensors in the sensor system. Some or all of the sensors may be modeled in these examples.

The sensor data generated by the models may be referred to as simulation sensor data. The sensor data generated by the sensor system may be referred to as live sensor data. The live sensor data and the simulation sensor data are presented together during the training session.

With reference now to FIG. 1, an illustration of a block diagram of a training environment is depicted in accordance with an illustrative embodiment. In this illustrative example, training environment 100 includes vehicle 102. Vehicle 102 takes the form of aircraft 104 in these depicted examples. Training session 106 may be performed using aircraft 104, in which simulation environment 108 and live environment 110 are both present in training environment 100.

In this illustrative example, network interface 112, display system 114, sensor system 116, and computer system 118 are associated with aircraft 104. A first component may be considered to be associated with a second component by being secured to the second component, bonded to the second component, fastened to the second component, and/or connected to the second component in some other suitable manner. The first component also may be connected to the second component by using a third component. The first component also may be considered to be associated with the second component by being formed as part of and/or an extension of the second component.

Computer system 118 comprises number of computers 119 in this illustrative example. Number of computers 119 may be in communication with each other using wired or wireless communications links in these illustrative examples. Training software 120 runs on number of computers 119 in these illustrative examples. Sensor system 116 generates live sensor data 121. Simulation data 122 is received by network interface 112 over wireless communications link 124.

In these illustrative examples, simulation data 122 may be for number of simulation objects 125. In these illustrative examples, a simulation object is an object created by a computer program or an object represented by a training device. In other words, a simulation object is not a physical object in these examples.

In these illustrative examples, live sensor data 121 is data generated by sensor system 116 associated with aircraft 104 detecting number of live objects 126 in training environment 100. A live object, as used in these illustrative examples, is a physical or real object. In other words, a live object can be seen, touched, and/or handled. For example, when the live object is an aircraft, the live object is the actual aircraft and not a computer representation of the aircraft or a training device for the aircraft. As used herein, a number of, where referring to items, means one or more items. For example, number of live objects 126 is one or more live objects. In these illustrative examples, number of live objects 126 is detected by number of sensors 128 within sensor system 116.

In these illustrative examples, computer system 118 is configured to run training software 120 during training session 106 using aircraft 104 in these examples. Computer system 118 is configured to run training software 120 in a manner that presents live sensor data 121 and simulation data 122 together on display system 114. In these illustrative examples, training software 120 generates simulation sensor data 123 using simulation data 122 in presenting simulation sensor data 123. As a result, simulation sensor data 123 and live sensor data 121 may be processed to generate information about objects that are live and simulated. In other words, live sensor data 121 may be used to generate information about live objects. Simulation sensor data 123 may be used to generate information about objects that are only simulated and not physically present.

In these illustrative examples, simulation data 122 is data generated by a program running on a computer system or by a training device. For example, training environment 100 also may include at least one of number of simulation programs 130, number of training devices 132, and other suitable systems configured to generate simulation data 122.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

In these examples, number of simulation programs 130 generates simulation data 122 in the form of constructive data 134. Constructive data 134 is data generated by a software program to simulate an object. The object may be, for example, without limitation, an aircraft, a ground vehicle, a missile site, a missile, or some other suitable object.

Number of training devices 132 generates virtual data 136 in simulation data 122. Virtual data 136 is any data generated through the use of number of training devices 132. Number of training devices 132 is any device that may be operated by a human operator. In these illustrative examples, number of training devices 132 may take the form of number of flight simulators 138. In this example, number of flight simulators 138 may be used to generate number of simulation objects 125. Number of simulation objects 125 may be fighter aircraft, transport aircraft, or other suitable types of aircraft in these examples.

In these illustrative examples, computer system 140 comprises number of computers 142. Number of simulation programs 130 may run on one or more of number of computers 142. In these illustrative examples, number of training devices 132 is in communication with computer system 140. Number of training devices 132 sends virtual data 136 to computer system 140. Computer system 140 takes constructive data 134 and virtual data 136 and sends this data as simulation data 122 to computer system 118 in aircraft 104. Simulation data 122 may include information about simulation objects. For example, simulation data 122 may include information identifying a location of a simulation object, a heading of a simulation object, an identification of a simulation object, and other suitable information.

In these illustrative examples, computer system 118 also may generate ownship data 144. Ownship data 144 is data describing aircraft 104. Ownship data 144 is sent to computer system 140 over wireless communications link 124 through network interface 112. Ownship data 144 may include, for example, at least one of a position of aircraft 104, a speed of aircraft 104, and other suitable data. Ownship data 144 also may include, for example, data indicating that number of weapons 150 have been fired on aircraft 104. The firing of number of weapons 150 is simulated and not actual firings of number of weapons 150. Simulation data 148 includes information about the firing of number of weapons 150.

Computer system 140 receives ownship data 144. Ownship data 144 is used by number of simulation programs 130 and number of training devices 132 to perform training session 106. In these illustrative examples, ownship data 144 is used to represent aircraft 104 as an object in a simulation. Ownship data 144 allows other aircraft, vehicles, and/or objects to interact with aircraft 104 in the simulation. For example, ownship data 144 may be used by number of simulation programs 130 and number of training devices 132 to identify a location of aircraft 104. This information may be used to determine how number of simulation objects 125 in the simulation interacts with aircraft 104. In other words, ownship data 144 may be used to generate a simulation object for aircraft 104 that can be used within number of simulation programs 130 and/or by number of training devices 132.

In these illustrative examples, training session 106 may be performed while aircraft 104 is in flight 152 and/or on ground 154. In some illustrative embodiments, all of training session 106 for a particular exercise may be performed on ground 154. In some illustrative embodiments, some events may occur while aircraft 104 is on ground 154 prior to taking off in flight 152.

The illustration of training environment 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, additional aircraft, in addition to aircraft 104, may be present in training environment 100 for performing training session 106. In yet other illustrative embodiments, number of training devices 132 may be unnecessary with only number of simulation programs 130 being used.

In these illustrative examples, simulation sensor data 123 may be generated in a location other than computer system 118 in aircraft 104. For example, a portion of training software 120 may run on a computer on the ground and generate the simulation sensor data.

Simulation sensor data 123 may be transmitted over wireless communications link 124 to network interface 112 in place of or in addition to simulation data 122.

Figure 2:
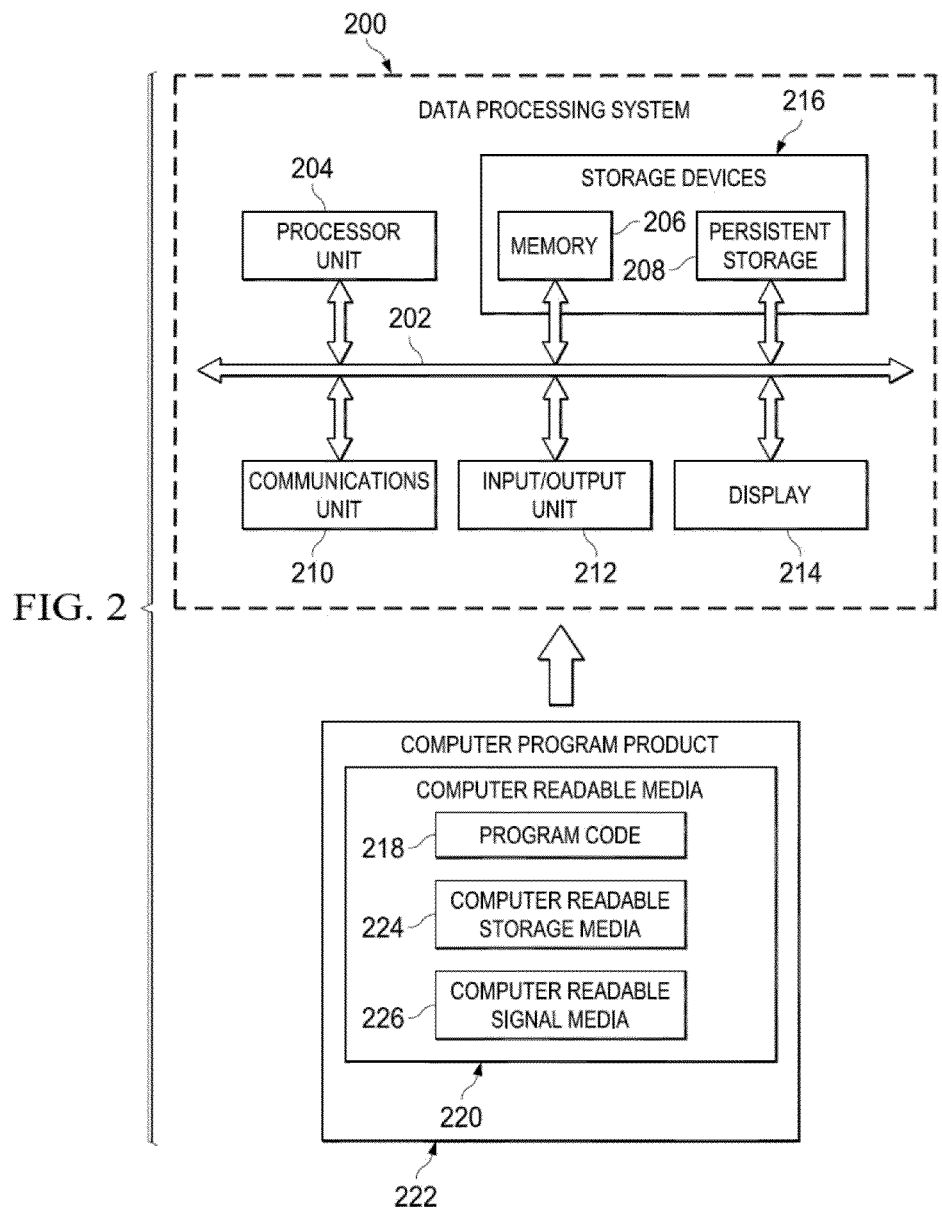
FIG. 2 is an illustration of a data processing system in accordance with an illustrative embodiment.

Turning now to FIG. 2, an illustration of a data processing system is depicted in accordance with an illustrative embodiment. Data processing system 200 is an example of a data processing system that may be used to implement computers, such as number of computers 119 in computer system 118 and number of computers 142 in computer system 140 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory or any other suitable volatile or non-volatile storage device.

Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226.

Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200.

Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As one example, in some illustrative embodiments, display 214 may not be needed. In this type of implementation, data processing system 200 may be implemented as a server computer or line replaceable unit. A display may be unnecessary in this type of implementation. As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
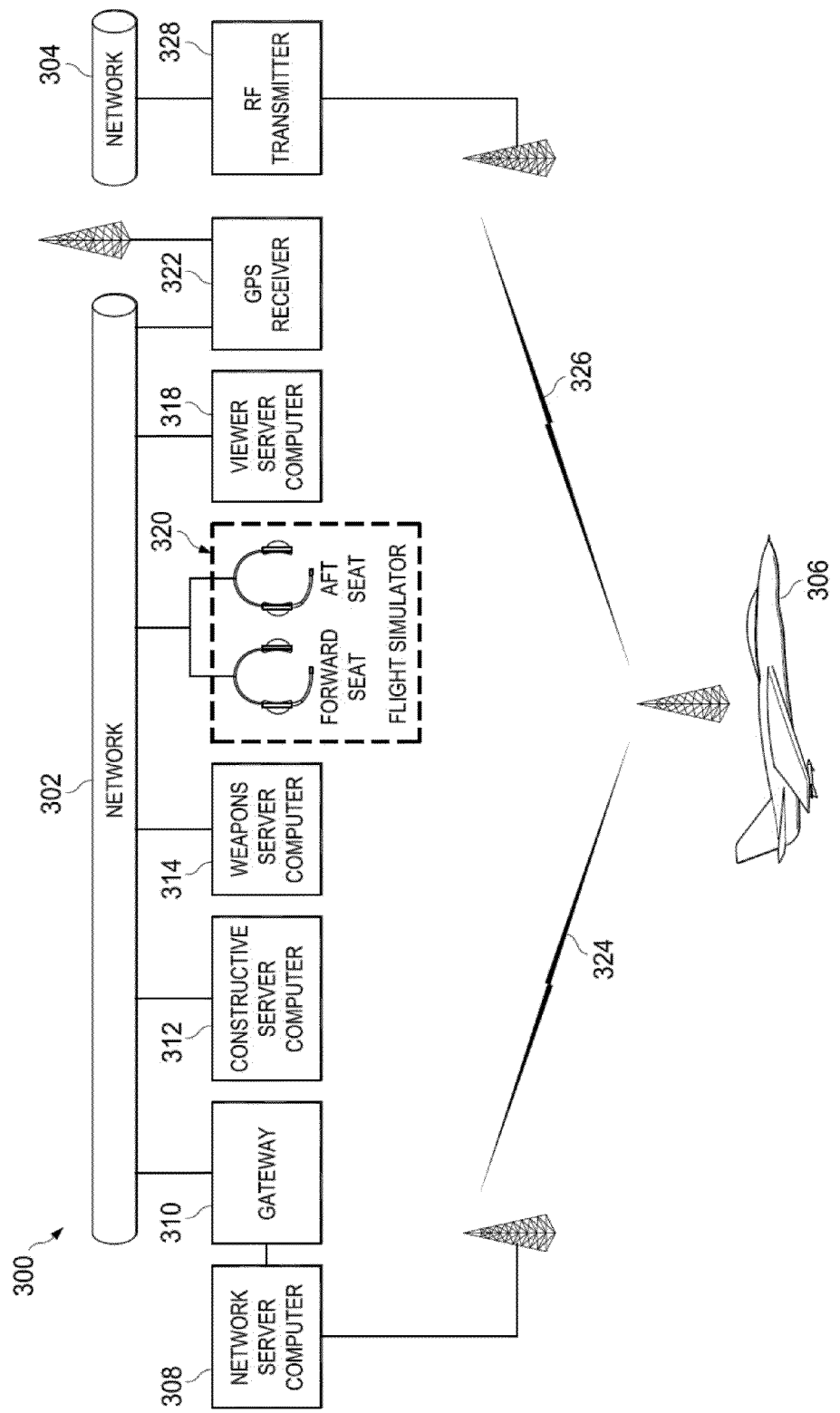
FIG. 3 is an illustration of a training environment in accordance with an illustrative embodiment.

With reference now to FIG. 3, an illustration of a training environment is depicted in accordance with an illustrative embodiment. In this illustrative example, training environment 300 is an example of one implementation for training environment 100 in FIG. 1.

As depicted, training environment 300 includes network 302, network 304, aircraft 306, and network server computer 308. Network 302 includes gateway 310, constructive server computer 312, weapons server computer 314, viewer server computer 318, flight simulator 320, and global positioning system receiver 322. In these illustrative examples, network server computer 308 exchanges information with aircraft 306. This exchange of information is performed using wireless communications link 324.

Gateway 310 provides a connection between network server computer 308 and other components in network 302. In other words, all information exchanged between network 302 and network server computer 308 flows through gateway 310.

Constructive server computer 312 runs simulations of different objects. These different objects are simulation objects in these examples. For example, constructive server computer 312 may run simulations of other aircraft for the training involving aircraft 306. As another example, constructive server computer 312 may run simulations to generate simulation objects, such as ground vehicles, ground stations, and other suitable objects.

Weapons server computer 314 runs processes to simulate the firing of weapons by aircraft 306. The firing of weapons by aircraft 306, in these examples, is simulation objects for the actual weapons. Weapons server computer 314 processes any indications of weapons fired by aircraft 306 to determine the direction and location of impact for the weapons.

Weapons server computer 314 simulates the weapon in flight and weapon detonation. Weapons server computer 314 publishes information about weapon type, position, velocity, acceleration, and state on network 302. Additionally, weapons server computer 314 also may determine whether a particular object has been damaged or destroyed.

Viewer server computer 318 provides a capability to view the training that occurs. For example, viewer server computer 318 may display a map identifying the location of different objects including live and simulation objects. Further, viewer server computer 318 also may display results from weapons fire or other events. Viewer server computer 318 may be used during the training session to view events as they occur. Additionally, viewer server computer 318 may be used to provide a debriefing and analysis of the training session after the training session has completed.

In these illustrative examples, global positioning system receiver 322 is used within training environment 300 to create a common time source. Global positioning system receiver 322 may generate information about time. This common time source may be used by other computers and processes to synchronize the performance of different operations. Global positioning system receiver 322 is used to generate a common timestamp that is the same for the different components in training environment 300.

Flight simulator 320 is a flight simulator that may be used to generate virtual data. The simulations performed using constructive server computer 312 and flight simulator 320 is sent through gateway 310 to network server computer 308. The virtual data and the constructive data form simulation data for use by aircraft 306.

Network server computer 308 sends the virtual data and the constructive data to aircraft 306. Further, any data generated by aircraft 306 is returned through network server computer 308 over wireless communications link 324. This information is then sent to network 302 for use by constructive server computer 312, weapons server computer 314, and flight simulator 320.

In these illustrative examples, voice communications, such as those generated by operators of flight simulator 320 or generated by constructive server computer 312, are sent to network 304. In turn, network 304 sends these communications over radio frequency communications link 326 to aircraft 306 using radio frequency (RF) transmitter 328.

The illustration of training environment 300 in FIG. 3 is not meant to imply physical or architectural limitations to the manner in which different illustrative embodiments may be implemented. This particular illustration is an example of one implementation of the manner in which training environment 100 in FIG. 1 may be implemented. In other illustrative embodiments, different components may be used in addition to or in place of the ones illustrated in these examples.

For example, the functions provided by the different server computers may be integrated into fewer numbers of computers or additional computers. In one example, the functions and processes for all of the different server computers illustrated in training environment 300 may be implemented on a single computer.

Further, flight simulator 320 may be a separate device from the computers running the servers in these examples. Flight simulator 320 may include a full-size replica of the cockpit for an operator.

Figure 4:
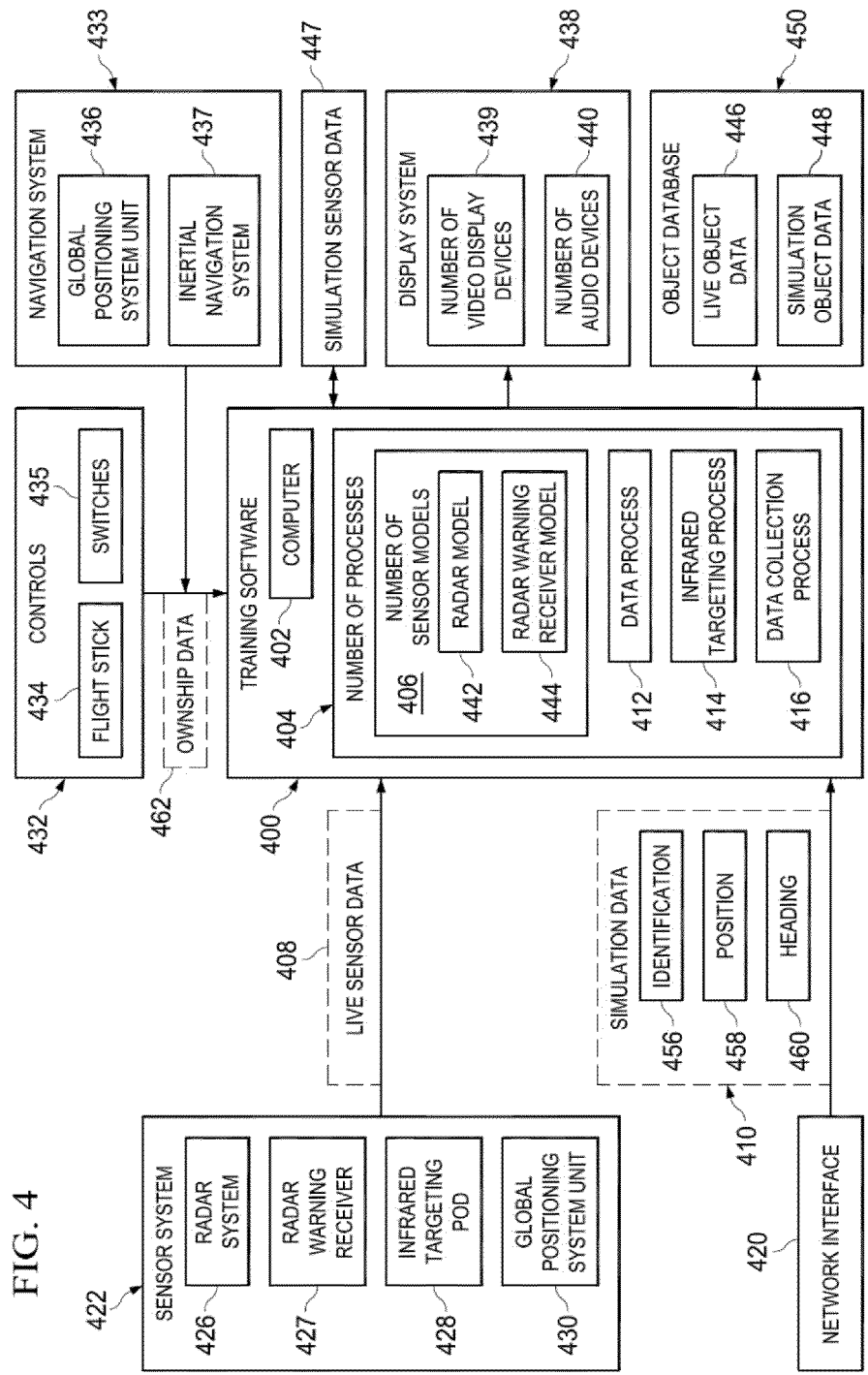
FIG. 4 is an illustration of training software in accordance with an illustrative embodiment.

With reference now to FIG. 4, an illustration of training software is depicted in accordance with an illustrative embodiment. In this illustrative example, training software 400 is an example of one implementation for training software 120 in FIG. 1. As illustrated, training software 400 runs on computer 402 during a training session. In the illustrative examples, training software 400 may be loaded onto computer 402 to run training exercises. Computer 402 may be implemented using data processing system 200 in FIG. 2 and is an example of one implementation for computer system 118 in FIG. 1.

Training software 400 comprises number of processes 404. Number of processes 404 may include number of sensor models 406. As illustrated, number of processes 404 includes data process 412, infrared targeting process 414, and data collection process 416. In these illustrative examples, number of processes 404 may process live sensor data 408 and simulation data 410. Number of processes 404 receives simulation data 410 from network interface 420.

Live sensor data 408 is received from sensor system 422. Sensor system 422, in these illustrative examples, may include at least one of radar system 426, radar warning receiver 427, infrared targeting pod 428, global positioning system unit 430, and other suitable components.

In these illustrative examples, number of processes 404 also may receive ownship data 462 from controls 432 and navigation system 433. As depicted, controls 432 may comprise at least one of flight stick 434, switches 435, and other suitable controls that may be located within the aircraft. Navigation system 433 may include at least one of global positioning system unit 436, inertial navigation system 437, and other suitable types of systems.

In these depicted examples, number of processes 404 combine live sensor data 408 and simulation data 410 for presentation on display system 438. Display system 438 may include, for example, number of video display devices 439 and number of audio devices 440. Display system 438 is the display system used in the aircraft and does not require modifications in the different illustrative embodiments.

Number of sensor models 406 provides models of the physical sensors located in sensor system 422. In these different illustrative embodiments, number of sensor models 406 processes simulation data 410 to generate simulation sensor data 447.

Number of sensor models 406 includes radar model 442 and radar warning receiver model 444. A model, in these illustrative examples, is a process that is designed to simulate a live or physical object. For example, radar model 442 is designed to simulate the operation of radar system 426. Radar warning receiver model 444 is a process designed to simulate the operation of radar warning receiver 427. Radar model 442 and radar warning receiver model 444 generate output that is the same or substantially the same as the output generated by radar system 426 and radar warning receiver 427, respectively.

In this illustrative example, infrared targeting process 414 in number of processes 404 receives live sensor data 408 from infrared targeting pod 428. Additionally, infrared targeting process 414 may receive information about objects in simulation data 410. In this illustrative example, infrared targeting process 414 adds data to live sensor data 408 based on information in simulation data 410. In this example, the data generated by infrared targeting process 414 also is part of simulation sensor data 447 in these examples. For example, infrared targeting process 414 may add symbols to live sensor data 408 from infrared targeting pod 428 to simulate various objects, such as aircraft, missiles, ground radar, and other objects.

Data process 412 in number of processes 404 receives simulation sensor data 447 and live sensor data 408. In these illustrative examples, data process 412 generates live object data 446 and simulation object data 448. Live object data 446 is information about real or physical objects detected by sensor system 422. Simulation object data 448 also may be generated by infrared targeting process 414 processing live sensor data 408 to create simulation object data 448.

Simulation object data 448 is information generated about simulation objects received in simulation sensor data 447. This information may include, for example, without limitation, an identification of an object, a graphical identifier to use with the object, and other suitable information.

Also, in these different illustrative examples, simulation object data 448 may include identifiers or flags to indicate that the particular object is a simulation object and not a live or physical object. This information may be used to generate graphical indicators such that an operator can determine which objects are live or simulated. In these examples, the graphical indicators may be presented on number of video display devices 439 in display system 438. Live object data 446 and simulation object data 448 form object database 450.

In these illustrative examples, data process 412 generates live object data 446 from live sensor data 408 received from sensor system 422. For example, objects detected by radar system 426 are identified and processed by data process 412. Each identified object forms an object within live object data 446.

In these illustrative examples, simulation data 410 may include identification 456, position 458, and heading 460 for a simulation object. Radar model 442 may use this information as input to generate simulation sensor data 447. In a similar fashion, simulation data 410 may be processed by data process 412 using radar warning receiver model 444 to generate simulation sensor data 447 for the simulation object as being a friend or foe.

In these illustrative examples, data process 412 uses live object data 446 and simulation object data 448 in object database 450 as a single presentation on display system 438. In other words, both live objects and simulation objects are presented and interacted with by an operator of the aircraft such that both live sensor data 408 and simulation data 410 are presented together in an integrated presentation.

In these illustrative examples, live object data 446 and simulation object data 448 may be presented on display system 438. This information may be presented on number of video display devices 439 to provide an operator an indication of where different objects may be located relative to the aircraft. Further, number of audio devices 440 also may be used to present live object data 446 and simulation object data 448 from object database 450. In some cases, audio warnings or messages may be presented based on information in object database 450.

Data collection process 416 may receive ownship data 462 from controls 432 and from navigation system 433. For example, data collection process 416 may receive an indication of a firing of a weapon in response to an activation of a control in controls 432. Additionally, data collection process 416 receives position information from global positioning system unit 436 and inertial navigation system 437.

This information is sent back as ownship data 462 to a remote location through network interface 420. Ownship data 462 is used by simulation programs and training devices, such as number of simulation programs 130 and number of training devices 132 in FIG. 1. Ownship data 462 may be used to represent the aircraft as an object within the simulations run by number of simulation programs 130 and number of training devices 132 in FIG. 1.

The illustration of training software 400 in FIG. 4 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, some processes in number of processes 404 and number of sensor models 406 may run on a different computer, other than computer 402 in the aircraft. In yet other illustrative embodiments, number of sensor models 406 may be unnecessary if simulation data 410 includes simulation object data 448 for use by number of processes 404. Simulation object data 448 may be sent as part of simulation data 410 if sufficient bandwidth is present for use by network interface 420. In other words, the different models for the sensor system in the aircraft may be run in a remote location with that sensor data being sent to computer 402 for processing and presentation.

Object database 450 may be transmitted to a remote location using network interface 420 during the training. In some illustrative embodiments, object database 450 may be downloaded after the flight is completed. Object database 450 may be reviewed to evaluate the training that was performed.

As another example, although the illustrative example shows radar model 442 and radar warning receiver model 444, other models also may be used in addition to or in place of the ones depicted. For example, these models may include an Interrogator Friend or Foe model, a chaff and flair dispenser model, an electronic warfare jamming model, and/or other suitable models.

Figure 5:
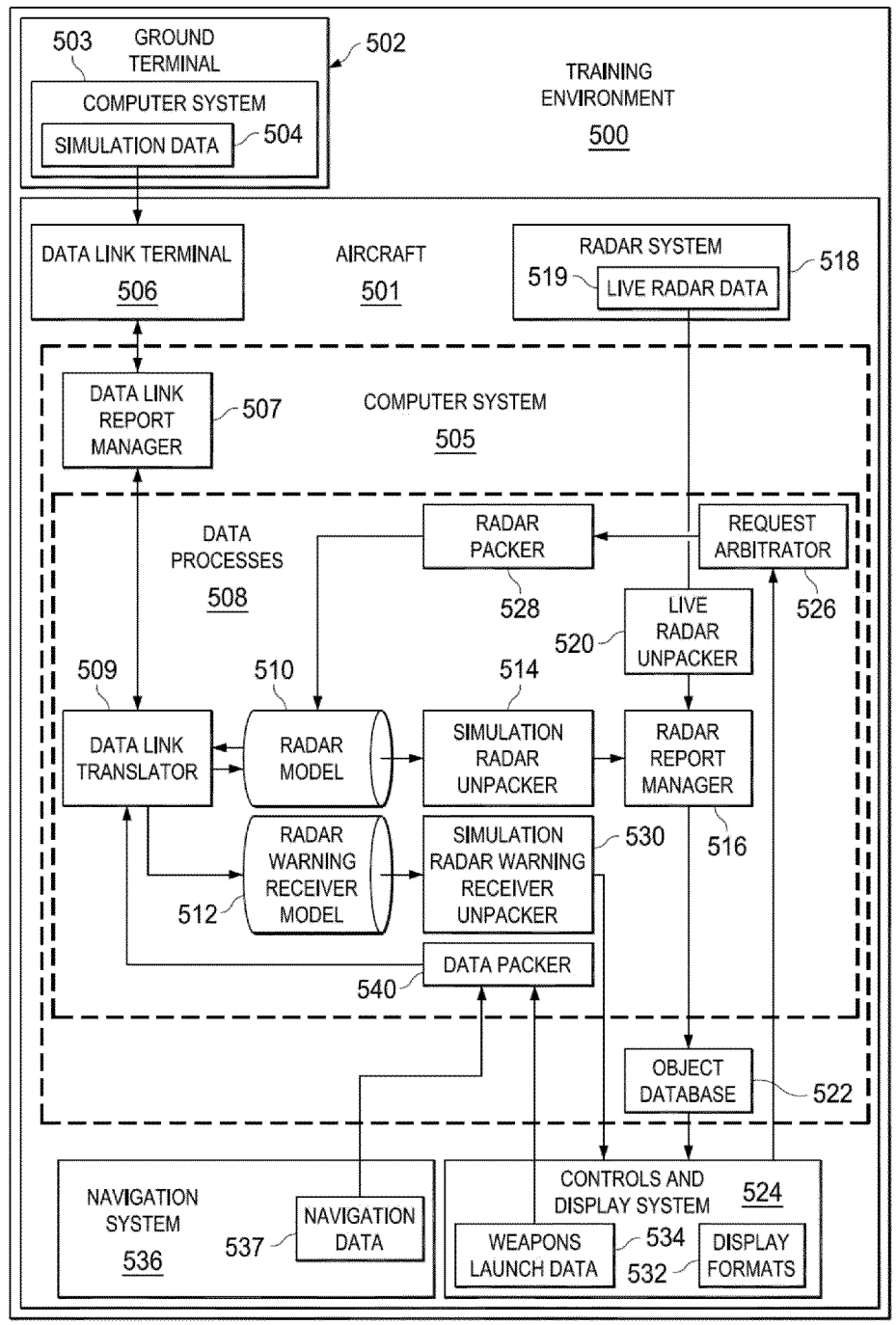
FIG. 5 is an illustration of data flow in a training environment in accordance with an illustrative embodiment.

With reference now to FIG. 5, an illustration of data flow in a training environment is depicted in accordance with an illustrative embodiment. In this illustrative example, training environment 500 is an example of one implementation of training environment 100 in FIG. 1. Further, training environment 500 may be implemented using training software 400 in FIG. 4. The data flow illustrated in this example is for processing simulation data and live data for aerial objects that may be encountered by an aircraft.

As depicted, training environment 500 includes aircraft 501 and ground terminal 502. Ground terminal 502 has computer system 503 for sending simulation data 504 to aircraft 501. Simulation data 504 is sent using a wireless communications link in this illustrative example. Simulation data 504 is received by aircraft 501 using data link terminal 506. Data link terminal 506 may take the form of an avionics device configured to generate and receive different types of data in these examples.

Data at data link terminal 506 is sent to data link report manager 507 running on computer system 505 in aircraft 501. Data link report manager 507 identifies simulation data 504 received from data link terminal 506 and sends simulation data 504 to data processes 508 for processing. In these illustrative examples, data link terminal 506 and data link report manager 507 form a network interface, such as network interface 420 in FIG. 4, between computer system 503 and computer system 505.

Simulation data 504 is sent from data link report manager 507 to data link translator 509. Data link translator 509 is a process in data collection process 416 in FIG. 4 in these illustrative examples. Data link translator 509 separates the simulation data into arrays of simulation data. A portion of these arrays of simulation data is sent into radar model 510, and a portion of these arrays of simulation data is sent into radar warning receiver model 512. The portion of the arrays of simulation data sent into radar model 510 may include information, such as, for example, simulation object information and/or other suitable information. The portion of the arrays of simulation data sent into radar warning receiver model 512 may include information, such as, for example, simulation information about radar emission sources external to aircraft 501.

Radar model 510 generates simulation sensor data. This simulation sensor data is sent to simulation radar unpacker 514. The simulation sensor data may have a format similar to or substantially the same as a format for radar system 518 in aircraft 501. Simulation radar unpacker 514 changes the format of the simulation sensor data into a format for storage in object database 522.

In this illustrative example, radar system 518 generates live radar data 519. Live radar data 519 is sent to live radar unpacker 520 in data processes 508. Live radar unpacker 520 changes the format of live radar data 519 into a format for storage in object database 522. As depicted, both simulation radar unpacker 514 and live radar unpacker 520 send the data with the changed format to radar report manager 516.

Radar report manager 516 identifies simulation object data and live object data for storage in object database 522 and then stores this data in object database 522. Both the simulation object data and the live object data may have substantially the same format in these examples. In some illustrative embodiments, the simulation object data may be associated with an identifier to identify the data as simulation data and not live data.

The data stored in object database 522 may be sent to controls and display system 524. In other words, an operator may control and view the simulation object data and live object data stored using controls and display system 524.

In this depicted example, radar warning receiver model 512 generates simulation sensor data that is sent to simulation radar warning receiver unpacker 530. Simulation radar warning receiver unpacker 530 changes the format of the simulation sensor data and sends the data with the changed format to controls and display system 524. The format of the data is changed such that the data may be controlled and viewed using controls and display system 524.

Controls and display system 524 may be implemented using controls 432 and/or display system 438 in FIG. 4. Further, controls and display system 524 may display the simulation object data and live object data using display formats 532. Display formats 532 may include, for example, without limitation, heads-up display formats, heads-down display formats, and/or other suitable types of formats.

In this illustrative example, an operator may send a request to request arbitrator 526 using controls and display system 524. This request may be, for example, a request to change a component, data, or some other feature of radar model 510. Request arbitrator 526 determines whether the request should be sent to radar model 510. Request arbitrator 526 uses a set of rules and/or a set of priorities for operations performed by radar model 510 to determine whether the request should be sent to radar model 510. As one illustrative example, if a request has a lower priority than an operation being performed by radar model 510, the request is not sent to radar model 510 until the completion of the operation. If the request may be sent to radar model 510, request arbitrator 526 sends the request to radar packer 528. Radar packer 528 changes the format of the request into a format radar model 510 may process.

Data processed using data processes 508 also is sent back to ground terminal 502 from aircraft 501. For example, weapons launch data 534 may be generated using the data presented using controls and display system 524. Weapons launch data 534 is sent to data packer 540. Data packer 540 also receives navigation data 537 generated by navigation system 536.

Data packer 540 changes the format of the data into a format for transmission to computer system 503. The data is sent to data link translator 509 along with simulation sensor data from radar model 510. This data is then sent to data link report manager 507 and then to data link terminal 506. The data is transmitted from data link terminal 506 to computer system 503 in ground terminal 502 using a wireless communications link.

Figure 6:
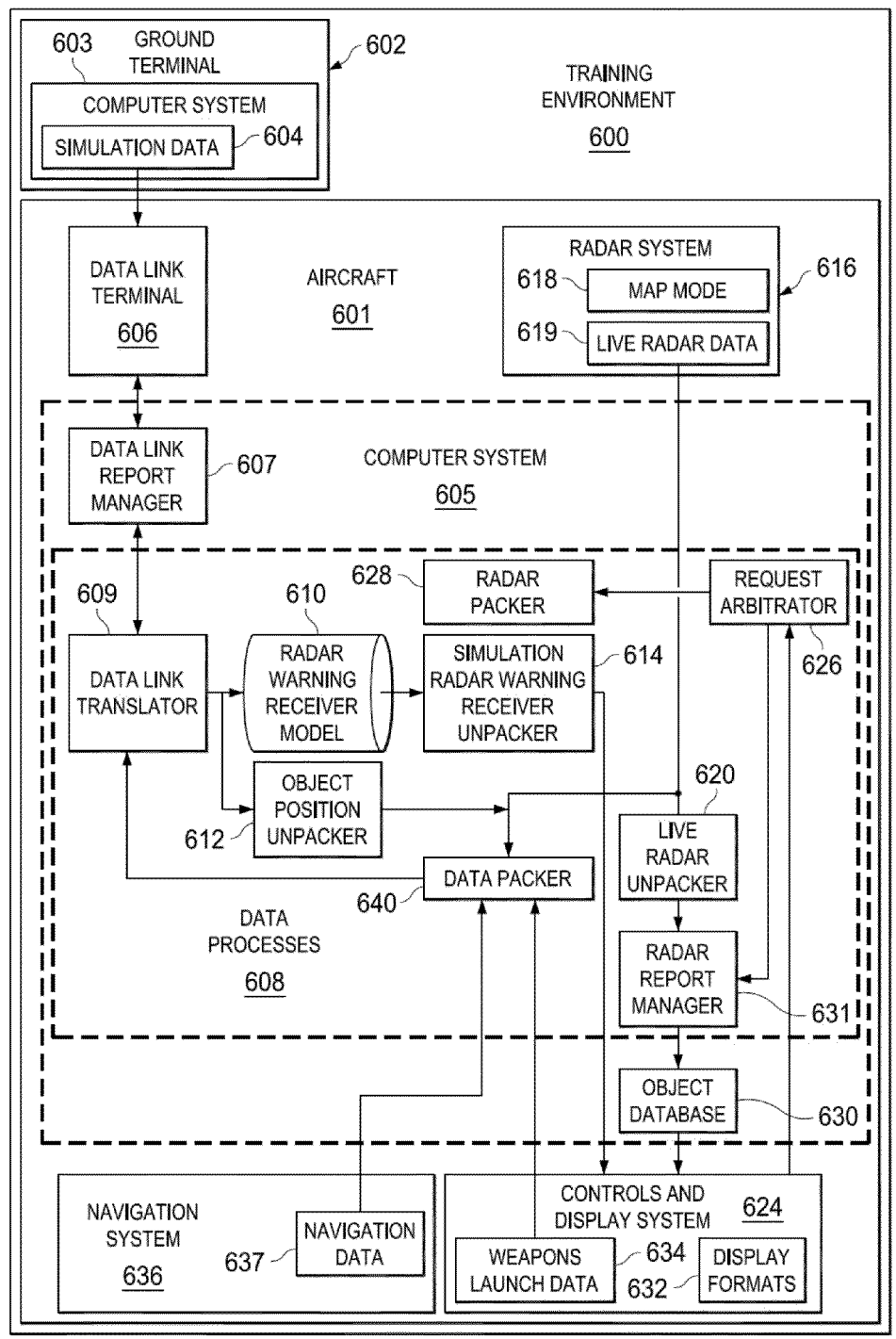
FIG. 6 is an illustration of data flow in a training environment in accordance with an illustrative embodiment.

With reference now to FIG. 6, an illustration of data flow in a training environment is depicted in accordance with an illustrative embodiment. In this illustrative example, training environment 600 is an example of one implementation of training environment 100 in FIG. 1. Further, training environment 600 may be implemented using training software 400 in FIG. 4. The data flow illustrated in this example uses components and processes similar to the data flow illustrated in FIG. 5. However, in this illustrative example, training environment 600 is for processing simulation data and live data for ground-based objects that may be encountered by an aircraft.

As depicted, training environment 600 includes aircraft 601 and ground terminal 602. Ground terminal 602 has computer system 603 for sending simulation data 604 to aircraft 601. Simulation data 604 is sent using a wireless communications link in this illustrative example. Simulation data 604 is received by aircraft 601 using data link terminal 606. Data at data link terminal 606 is sent to data link report manager 607 running on computer system 605 in aircraft 601. Data link report manager 607 identifies simulation data 604 received from data link terminal 606 and sends simulation data 604 to data processes 608 for processing.

Simulation data 604 is sent from data link report manager 607 to data link translator 609. Data link translator 609 separates simulation data 604 into arrays of simulation data. A portion of these arrays of simulation data is sent into radar warning receiver model 610. Another portion of these arrays of simulation data is sent to object position unpacker 612.

The portion of arrays of simulation data sent to object position unpacker 612 contains position data for simulation objects. In this illustrative example, these simulation objects are ground-based objects. Object position unpacker 612 changes the format of the arrays of simulation data such that the position data for the simulation objects may be controlled and viewed using controls and display system 624.

In this depicted example, radar warning receiver model 610 generates simulation sensor data from the arrays of simulation data. The simulation sensor data is sent to simulation radar warning receiver unpacker 614. Simulation radar warning receiver unpacker 614 changes the format of the simulation sensor data and sends the data with the changed format to controls and display system 624. The format of the data is changed such that the data may be controlled and viewed using controls and display system 624.

In this illustrative example, an operator may use the position data for the simulation objects presented in controls and display system 624 to select a simulation object to be monitored using radar system 616. The operator may send a request to request arbitrator 626 based on the selected simulation object. This request may be to change radar system 616 to map mode 618. Map mode 618 allows radar system 616 to monitor a particular area based on the position data for the selected simulation object. In other words, map mode 618 allows radar system 616 to monitor an area for a simulation object without identifying the simulation object or the specific position of the simulation object.

Request arbitrator 626 determines whether this request should be sent to radar system 616. This determination may be based on a set of rules and/or a set of priorities for operations performed by radar system 616. If the request is sent to radar system 616, request arbitrator 626 sends the request to radar packer 628. Radar packer 628 changes the format of the request to a format that may be processed by radar system 616. In this illustrative example, radar packer 628 changes the format of the request to a command that may be executed by radar system 616.

In response to receiving the request with the changed format from radar packer 628, radar system 616 changes to map mode 618 and sends live radar data 619 to live radar unpacker 620. Live radar data 619 is a map of a particular area identified using the position data for the selected simulation object. Live radar unpacker 620 changes the format of live radar data 619 into a format for storage in object database 630. As depicted, live radar unpacker 620 sends the data with the changed format to radar report manager 631.

Further, request arbitrator 626 also sends data included in the request from the operator to radar report manager 631. This data may include information identifying the selected simulation object and/or the position data for the simulation object. Radar report manager 631 identifies simulation object data and live object data for storage in object database 630 and then stores this data in object database 630. In these illustrative examples, simulation object data and the live object data have substantially the same format.

The data stored in object database 630 is sent to controls and display system 624. In other words, an operator may control and view the simulation object data and live object data stored using controls and display system 624.

Controls and display system 624 displays the simulation object data and live object data using display formats 632. Display formats 632 may include, for example, without limitation, heads-up display formats, heads-down display formats, and/or other suitable types of formats.

Data processed using data processes 608 also is sent back to ground terminal 602 from aircraft 601. For example, weapons launch data 634 may be generated using the data presented using controls and display system 624. Weapons launch data 634 is sent to data packer 640. Data packer 640 also receives navigation data 637 generated by navigation system 636. Further, data packer 640 receives live radar data 619 from radar system 616. Data packer 640 changes the format of all the data received into a format for transmission to computer system 603. The data is sent to data link translator 609. This data is then sent to data link report manager 607 and then to data link terminal 606. The data is transmitted from data link terminal 606 to computer system 603 in ground terminal 602 using a wireless communications link.

Figure 7:
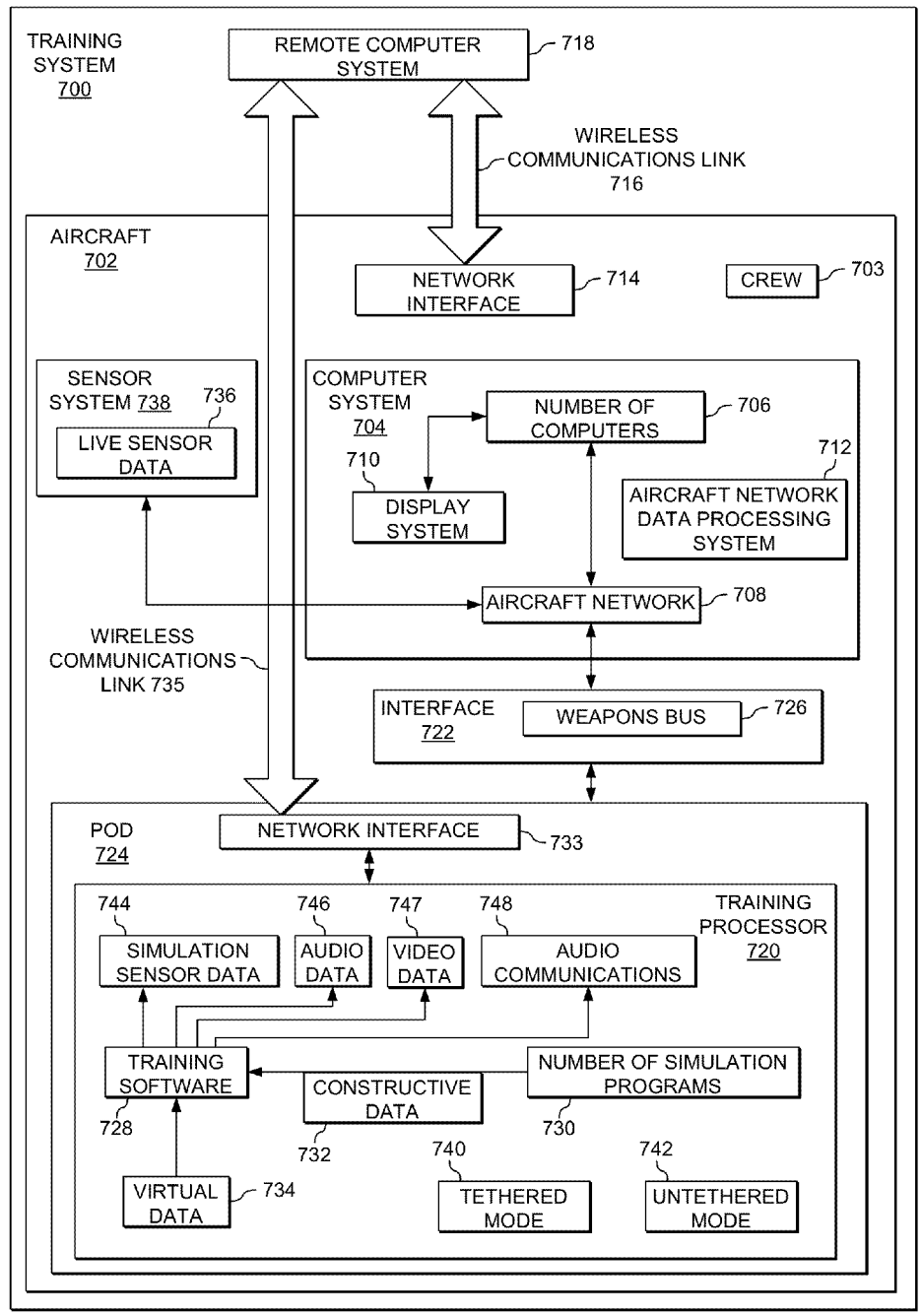
FIG. 7 is an illustration of a training system in accordance with an illustrative embodiment.

With reference now to FIG. 7, an illustration of a training system is depicted in accordance with an illustrative embodiment. In this illustrative example, training system 700 includes aircraft 702. Aircraft 702 is an example of an aircraft that may be used in training environment 100 in FIG. 1. Aircraft 702 may be used in place of or in addition to aircraft 104 in FIG. 1. Aircraft 702 may be used to train crew 703. Crew 703 may be one or more human operators that operate aircraft 702.

As depicted, aircraft 702 includes computer system 704. Computer system 704 is comprised of number of computers 706 in this illustrative example. If more than one computer is present in number of computers 706, those computers are in communication with each other using aircraft network 708. Computer system 704 also includes display system 710. Display system 710 comprises one or more display devices in aircraft 702. In this implementation, computer system 704 takes the form of aircraft network data processing system 712.

Aircraft 702 also has network interface 714. Network interface 714 is configured to provide wireless communications link 716 with remote computer system 718. Remote computer system 718 may be at a remote location on the ground in these illustrative examples.

In these illustrative examples, training processor 720 may be associated with aircraft 702. As depicted, training processor 720 may be removably connected to aircraft 702. Training processor 720 may be connected to aircraft 702 using interface 722. Interface 722 may provide power and communications for training processor 720. For example, interface 722 may be an interface to computer system 704 in aircraft 702.

In these illustrative examples, training processor 720 may be internally or externally connected to aircraft 702. In other words, training processor 720 may be located inside of or outside of aircraft 702.

In one illustrative example, training processor 720 may be configured to be used in pod 724 for aircraft 702. Training processor 720 may be placed into pod 724 or may be integrated as part of pod 724.

Pod 724 is a structure configured to be connected to the exterior of aircraft 702. In these illustrative examples, when training processor 720 is placed in pod 724, interface 722 may be weapons bus 726 for aircraft 702. As depicted, weapons bus 726 is an interface normally available on aircraft 702 for use with pods such as weapon pods. Weapons bus 726 may provide a connection between weapons and sensors in pod 724 connected to aircraft 702. Of course, interface 722 may take other forms.

As depicted, training processor 720 takes the form of hardware and software. Training processor 720 includes training software 728 and number of simulation programs 730. Training software 728 may be the same training software as training software 120 running on computer system 118 in aircraft 104 in FIG. 1. Number of simulation programs 730 may be implemented using the same simulation programs as number of simulation programs 130 in computer system 140 in FIG. 1. As can be seen, training processor 720 combines functions provided by computer system 118 and computer system 140 in this particular implementation.

In this depicted example, training processor 720 generates constructive data 732. Constructive data 732 is for a number of simulation objects that are simulated for a particular training session. Constructive data 732 may be generated in place of or in addition to constructive data 134 generated by computer system 140 in FIG. 1.

Further, training processor 720 also may receive virtual data 136 from number of training devices 132 in FIG. 1. Virtual data 136 may be received over wireless communications link 716 for aircraft 702. In some illustrative examples, pod 724 also may have network interface 733. Network interface 733 may be used to establish wireless communications link 735 between pod 724 and a ground system, such as remote computer system 718. With wireless communications link 735, training processor 720 may receive virtual data 734 without using network interface 714 and wireless communications link 716.

Virtual data 136 may be received directly from number of training devices 132 or from computer system 140, depending on the particular implementation. In these illustrative examples, virtual data 136 forms virtual data 734 used by training processor 720. Further, in some illustrative examples, training processor 720 also may receive live sensor data 736 generated by sensor system 738 associated with aircraft 702.

In these illustrative examples, training processor 720 may operate in tethered mode 740 or untethered mode 742. When operating in tethered mode 740, training processor 720 may receive virtual data 136. Further, training processor 720 also may receive constructive data 134 from number of simulation programs 130 in addition to generating constructive data 732.

Training processor 720, however, may still provide training for crew 703 even when wireless communications link 716 is absent or not usable by training processor 720. In some cases, aircraft 702 may not be able to establish wireless communications link 716. In still other illustrative examples, the amount of bandwidth available in wireless communications link 716 may preclude use of wireless communications link 716 by training processor 720.

Further, in untethered mode 742, training processor 720 may still use wireless communications link 735 to communicate with other aircraft using pods and training processors similar to pod 724 and training processor 720. In this situation, communications with a ground system may be absent or unavailable. Aircraft in a training session, however, may still communicate with each other to form a virtual battle space through communications links between training processors in the aircraft. In other words, remote computer system 718 may be a training processor in another aircraft.

In operation, training processor 720 uses constructive data 732 to generate simulation sensor data 744. Training processor 720 presents simulation sensor data 744 with live sensor data 736 generated by sensor system 738 on display system 710 in aircraft 702. In these illustrative examples, training processor 720 may send simulation sensor data 744 to computer system 704 for display on display system 710. Computer system 704 may receive live sensor data 736 and display live sensor data 736 with simulation sensor data 744.

In other illustrative examples, training processor 720 may also receive live sensor data 736 for use in processing simulation sensor data 744, generating constructive data 732, or for some other purpose with respect to a training session.

Additionally, training processor 720 also may generate audio data 746, video data 747, or some combination thereof. Audio data 746 may be, for example, sounds to simulate operation of systems in aircraft 702. The sounds may be, for example, sensor sounds, weapon sounds, and other suitable sounds.

Video data 747 may be displays generated for presentation in display system 710 in aircraft 702. Video data 747 may be for a number of simulated objects. These displays may include three-dimensional graphics of simulated objects, such as targets, terrain, and other suitable objects.

Further, training processor 720 also may provide audio communications 748 with training devices over wireless communications link 735. These training devices may be, for example, number of training devices 132 in FIG. 1. Audio communications 748 may be implemented using different technologies such as voice over internet protocol (VoIP).

In these illustrative examples, computer system 704 is configured to receive simulation sensor data 744, audio data 746, video data 747, audio communications 748, and/or other data generated by training processor 720. In other words, computer system 704 is configured to receive data from training processor 720 and display or otherwise present that data in computer system 704 to crew 703. In particular, one or more operational flight programs in aircraft 702 may be configured to communicate with training processor 720.

Figure 8:
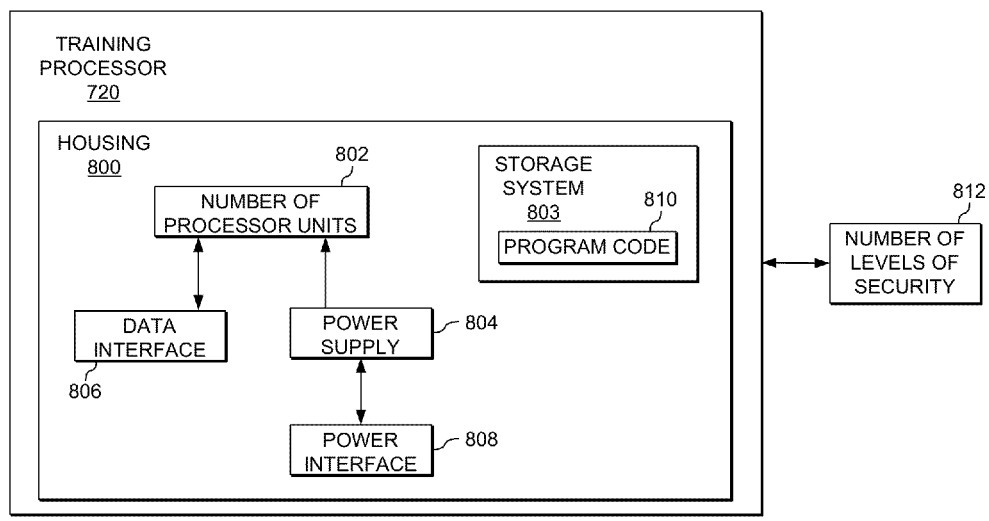
FIG. 8 is an illustration of a training processor in accordance with an illustrative embodiment.

Turning now to FIG. 8, an illustration of a training processor is depicted in accordance with an illustrative embodiment. In this illustrative example, training processor 720 comprises housing 800, number of processor units 802, storage system 803, power supply 804, data interface 806, and power interface 808.

Housing 800 is a physical structure configured to hold the different components for training processor 720. As depicted, housing 800 is configured to be moveable. Housing 800 may have a shape and size configured for placement into pod 724 in FIG. 7.

Each processor unit in number of processor units 802 may include one or more processors. These processors are configured to run program code 810 stored in storage system 803. Program code 810 is program code for training software 728 and number of simulation programs 730 in FIG. 7.

Storage system 803 comprises one or more storage devices. Storage system 803 may include, for example, at least one of a hard disk drive, a random access memory, a read only memory, a solid state drive, and other suitable types of storage devices.

Power supply 804 may receive and condition power received through interface 722. For example, power supply 804 may provide filtering, voltage conversion, and other suitable types of power processing. Data interface 806 provides communication with aircraft network 708 through interface 722 in these illustrative examples.

In these illustrative examples, number of levels of security 812 may be provided for training processor 720. Number of levels of security 812 may be provided through segregating processes in training software 728 and number of simulation programs 730. For example, processes may be segregated to run only on processor units in number of processor units 802 having a desired security level. Security levels may include, for example, unclassified, controlled unclassified, confidential, secret, top secret, and other suitable types of security classifications. Of course, any type of classification may be used. In some cases, the security levels may merely be confidential and non-confidential.

With this implementation, number of processor units 802 may be located on different boards in training processor 720. Further, storage devices in storage system 803 also may be distributed on these boards and may be accessible by only the processor unit on the same board as the storage device. In this manner, physical partitions may be present to provide desired security when number of levels of security 812 is present. This type of segregation may reduce maintenance and operational issues when different types of information and/or processes may be present that have different security levels.

Further, training processor 720 may be configured to self-heal or have fail-over capabilities in the event that some components fail within training processor 720. In these illustrative examples, if a processor unit running a process in number of processor units 802 is failing to operate as desired, a portion of the other processor units in number of processor units 802 runs the processes for the processor unit that is failing to operate as desired.

For example, if a processor unit within number of processor units 802 fails, one or more of the remaining processor units take over running processes that were originally running on the failing processor unit. In these illustrative examples, number of processor units 802 may include extra or redundant processor units that are present in case one or more processor units in number of processor units 802 fails to operate as desired.

The illustration of training system 700 in FIG. 7 is not meant to imply physical or architectural limitations to the manner in which training system 700 may be implemented. Other components in addition to, or in place of, the ones illustrated may be used. Some components may be unnecessary. Also, the blocks are presented to illustrate some functional components. One or more of these blocks may be combined, divided, or combined and divided into different blocks when implemented in an illustrative embodiment.

For example, although training processor 720 has been described as being placed in pod 724 connected to aircraft 702, training processor 720 may be configured for placement inside the cockpit of the aircraft, inside a fairing for an aircraft, mounted on a surface of the aircraft, or some other suitable location.

Thus, training processor 720 provides an ability to interject simulation data into computer system 704 to present simulated objects for training crew 703. The presentation of simulated objects may occur in conjunction with live objects that may be around aircraft 702.

In particular, training processor 720 allows for combining of constructive data 732 and/or virtual data 734 with live sensor data 736. As discussed above, constructive data 732, virtual data 734, or both may be used to generate simulation sensor data 744 that may be displayed with live sensor data 736 on display system 710.

In this manner, one or more illustrative embodiments provide an ability to train crew 703 in aircraft 702 using a system that is not integrated into computer system 704 of aircraft 702. As depicted, training processor 720 is configured to be moveable and may be moved from one aircraft to another aircraft. This portability of training processor 720 may reduce costs and reduce the time needed to configure an aircraft for use in training.

Additionally, with training processor 720 being a separate component from computer system 704, upgrades, modifications, and other changes to program code 810 in training processor 720 may be performed more often. In other words, changes to program code 810 or other components in training processor 720 may be made without waiting for upgrades or changes to operational flight programs in computer system 704 for aircraft 702. In other words, changes to training processor 720 may occur without having to wait for or take into account cycles for changes to operational flight programs or other software in aircraft 702.

Figure 9:
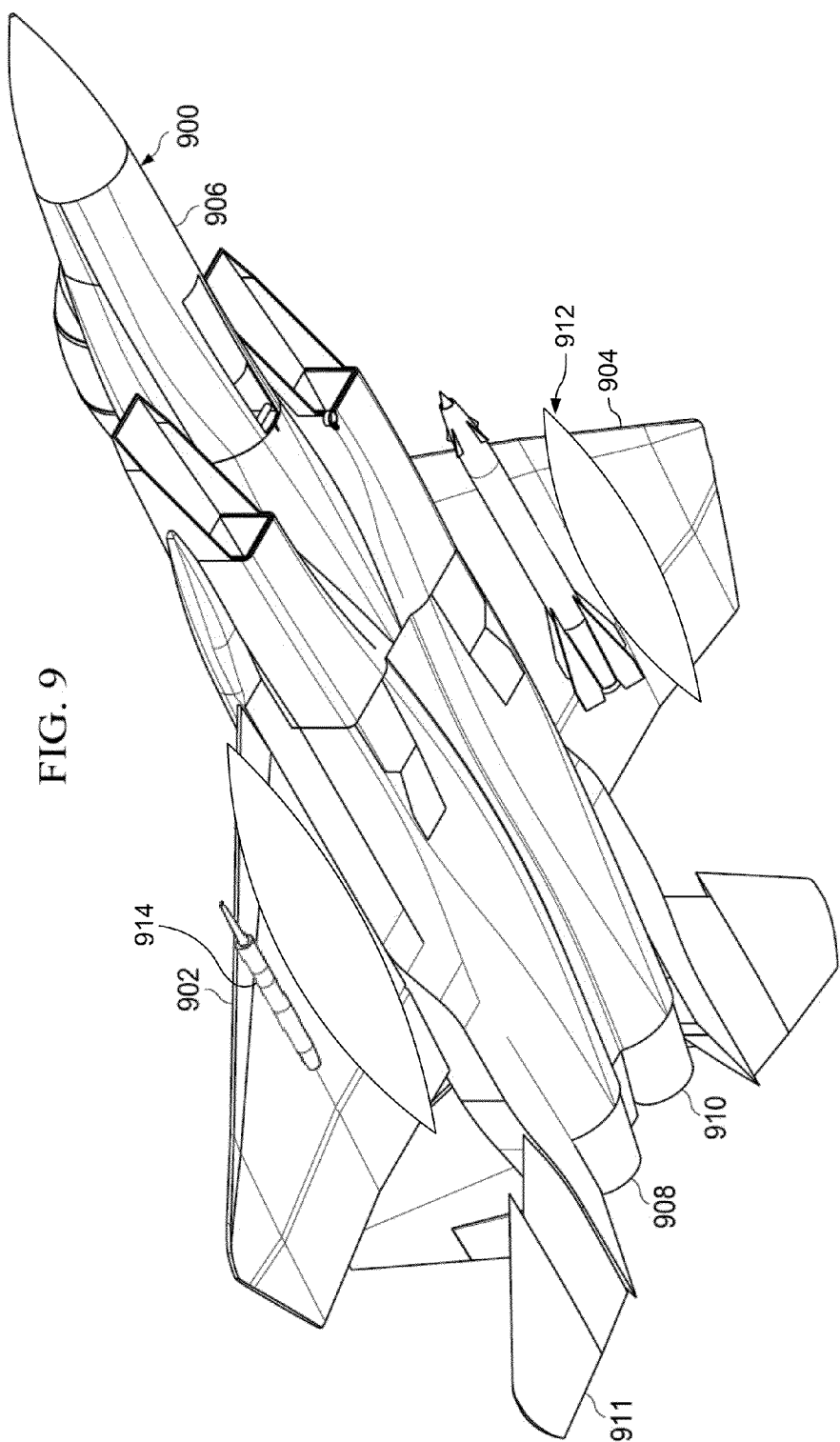
FIG. 9 is an illustration of an aircraft in accordance with an illustrative embodiment.

With reference now to FIG. 9, an illustration of an aircraft is depicted in accordance with an illustrative embodiment. Aircraft 900 is an example of a physical implementation of aircraft 702 in FIG. 7.

In this illustrative example, aircraft 900 has wing 902 and wing 904 attached to body 906 of aircraft 900. Engine 908 and engine 910 are connected to body 906. Additionally, aircraft 900 has tail section 911. In these depicted examples, aircraft 900 has pods 912. In these depicted example, an illustrative embodiment may be implemented using pod 914. Pod 914 may include a training processor such as training processor 720 in FIG. 7.

Figure 10:
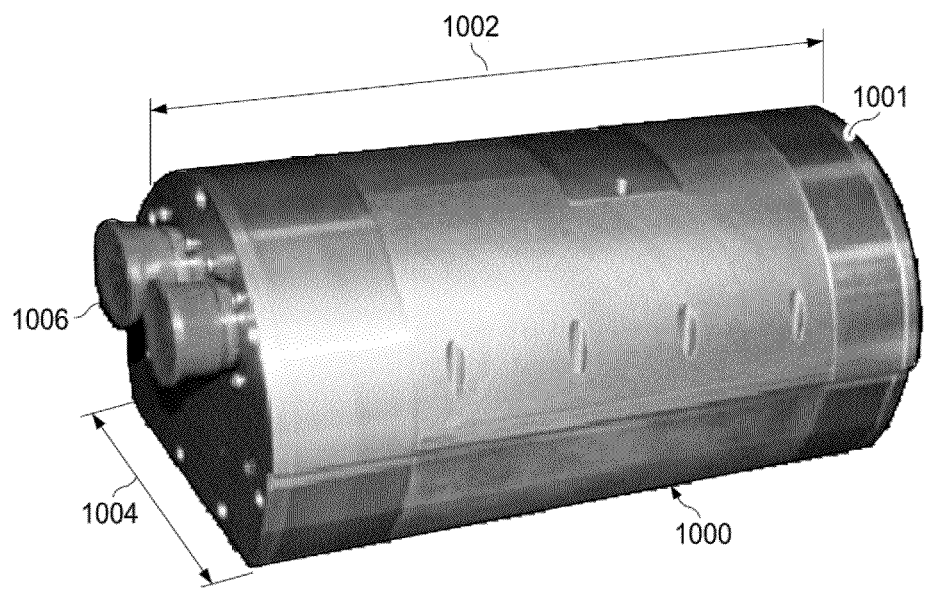
FIG. 10 is an illustration of a training processor in accordance with an illustrative embodiment.

Turning now to FIG. 10, an illustration of a training processor is depicted in accordance with an illustrative embodiment. In this illustrative example, training processor 1000 is an example of an implementation of training processor 720 in FIG. 7.

In this illustrative example, training processor 1000 has a shape configured for placement into pod 914. In this example, housing 1001 of training processor 1000 has length 1002 and width 1004. Length 1002 may be, for example, about 8.5 inches. Width 1004 may be about 4.5 inches in this illustrative example. Of course, housing 1001 of training processor 1000 may have any shape that can be placed into a pod such as pod 914.

Housing 1001 has connectors 1006. These connectors are configured to be connected to a pod interface such as a weapons bus.

Figure 11:
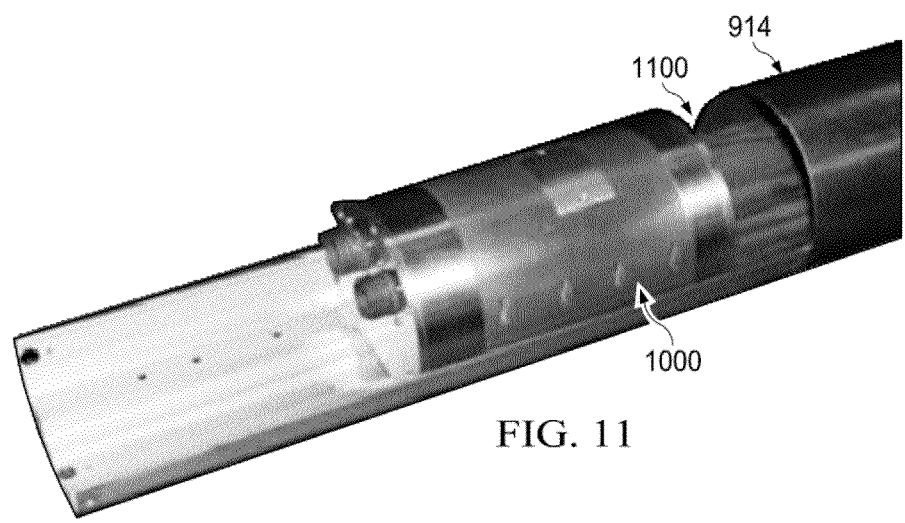
FIG. 11 is an illustration of a training processor in a pod in accordance with an illustrative embodiment.

Turning now to FIG. 11, an illustration of a training processor in a pod is depicted in accordance with an illustrative embodiment. In this illustrative example, training processor 1000 is shown in pod 914. A cover for pod 914 has been removed to allow for placement of training processor 1000 into pod 914. As can be seen, training processor 1000 has a shape configured for placement into interior 1100 of pod 914. Further, pod 914 also may include other components used for training exercises in addition to training processor 1000.

Examples of other components that may be present in pod 914 include, for example, a network interface, a computer, a power supply, a global positioning system receiver, a recording system to record missions for post mission analysis, and other suitable devices.

The illustration of aircraft 900 and training processor 1000 are not meant to imply physical or architectural limitations to the manner in which an illustrative may be implemented. Other types of aircraft and other shapes for training processors may be used in other illustrative embodiments. For example, although training processor 1000 is shown as a component in a housing that is placed into pod 914, training processor 1000 may be implemented differently in other illustrative embodiments. For example, training processor 1000 may be built into pod 914 rather than as a removable component for pod 914. In this example, pod 914 may, in essence, be training processor 1000.

Figure 12:
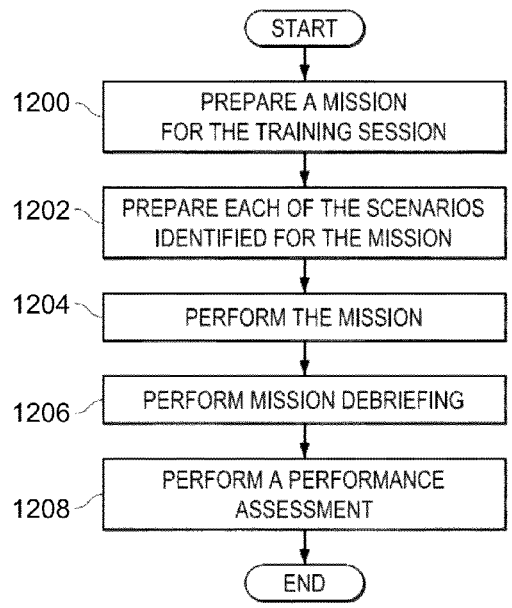
FIG. 12 is an illustration of a flowchart of a process for performing a training session in accordance with an illustrative embodiment.

With reference now to FIG. 12, an illustration of a flowchart of a process for performing a training session is depicted in accordance with an illustrative embodiment. The process illustrated in FIG. 12 may be used to perform training session 106 in training environment 100 in FIG. 1.

The process begins by preparing a mission for the training session (operation 1200). In this operation, a mission may be defined to have a number of different scenarios for the training session. These scenarios may include, for example, without limitation, an air-to-air engagement scenario, an air-to-ground strike scenario, a joint-operation scenario including other aircraft, and other suitable scenarios. With one or more of the different illustrative embodiments, multiple scenarios may be performed in a training session that may require more time, airspace, and equipment availability than possible to perform in a single training session or flight.

In this operation, the definition of a training area, the aircraft armament, sensor parameters, behavior, routes, and other information may be set. The process then prepares each of the scenarios identified for the mission (operation 1202). This operation includes defining the various parameters and equipment to be used in each scenario in the mission as planned in operation 1200. The operation may include identifying both live objects, as well as simulation objects.

The process performs the mission (operation 1204). In performing the mission, the data for the different scenarios is loaded onto the computer system for the training environment. Operation 1204 may be implemented using training software, such as training software 400 in FIG. 4. The number of live aircraft in the mission may then take off to perform the mission with simulation data being sent to the number of live aircraft. Further, during the flying of the mission, different scenarios may be repeated and rerun until desired results are obtained or until fuel becomes low.

Thereafter, mission debriefing is performed (operation 1206). In this operation, information from the mission is presented for review and analysis. For example, the database from the aircraft in the mission, as well as simulation data generated by the computer system, may be viewed. For example, flight paths and events that occurred during the mission may be viewed. Thereafter, a performance assessment is performed (operation 1208), with the process terminating thereafter. An assessment of the performance of the crew in the aircraft may be performed based on the results from the mission.

Figure 13:
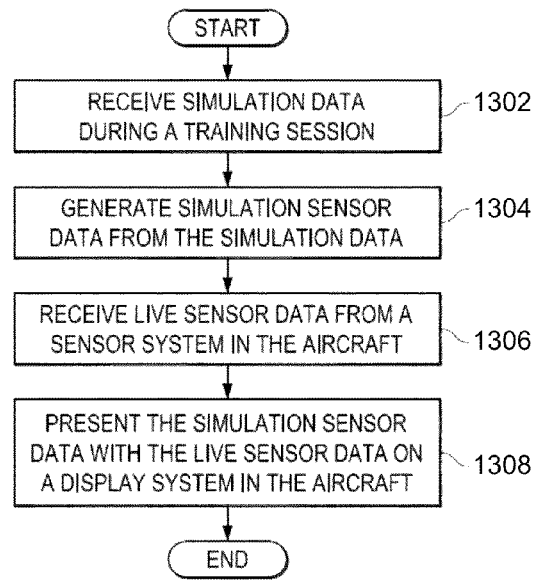
FIG. 13 is an illustration of a flowchart of a process for training in an aircraft in accordance with an illustrative embodiment.

With reference now to FIG. 13, an illustration of a flowchart of a process for training in an aircraft is depicted in accordance with an illustrative embodiment. The process in FIG. 13 may be implemented in a training environment, such as training environment 300 in FIG. 3. In particular, this process may be implemented in a computer system, such as computer system 118 in aircraft 104 in FIG. 1.

The process begins by receiving simulation data during a training session (operation 1300). In this illustrative example, the simulation data is received by the training software running on the aircraft. The communications system uses a wireless communications link to receive the simulation data. The process then generates simulation sensor data from the simulation data (operation 1302). In these illustrative examples, this process is performed in the aircraft. In other illustrative embodiments, a portion of the training software may operate in another location with the simulation sensor data being transmitted to the aircraft.

The process receives live sensor data from a sensor system in the aircraft (operation 1304). The process then presents the simulation sensor data with the live sensor data on a display system in the aircraft (operation 1306), with the process terminating thereafter.

Figure 14:
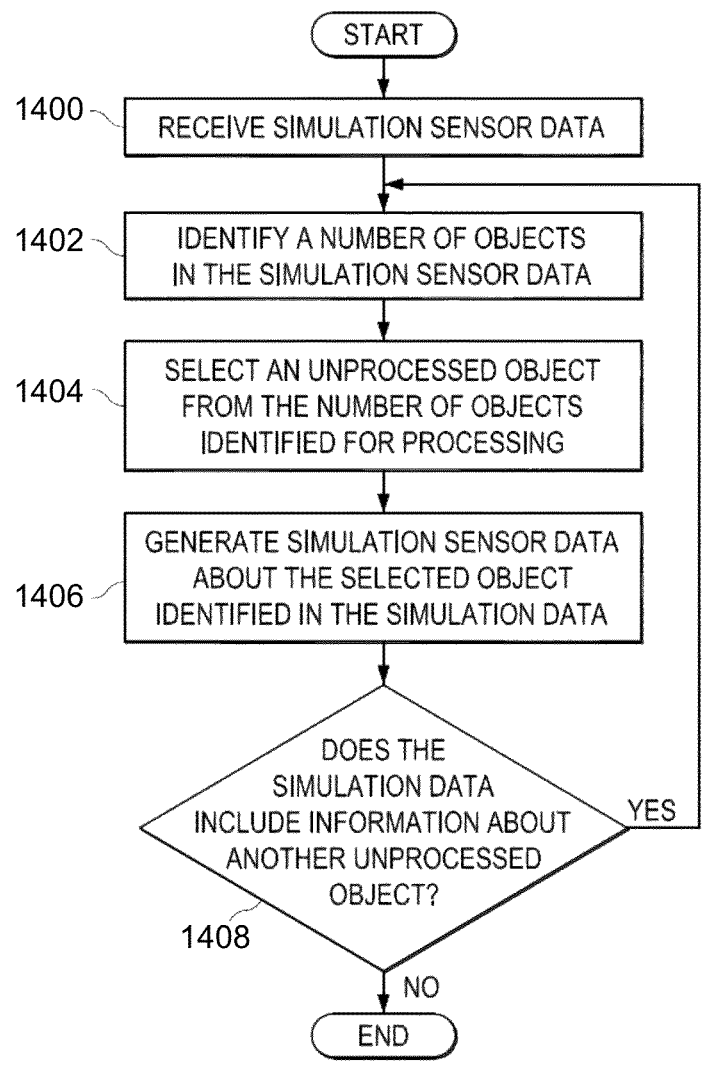
FIG. 14 is an illustration of a flowchart of a process for generating simulation sensor data received in an aircraft in accordance with an illustrative embodiment.

With reference now to FIG. 14, an illustration of a flowchart of a process for generating simulation sensor data received in an aircraft is depicted in accordance with an illustrative embodiment. The process illustrated in FIG. 14 may be implemented in software, such as training software 400 in FIG. 4. The simulation sensor data generated by the operations in this flowchart may be an example of simulation sensor data 447, which may be used to generate simulation object data 448 in FIG. 4.

The process begins by receiving simulation sensor data (operation 1400). The process identifies a number of objects in the simulation sensor data (operation 1402). The process then selects an unprocessed object from the number of objects identified for processing (operation 1404).

Thereafter, the process generates simulation sensor data about the selected object identified in the simulation data (operation 1406). This information may include, for example, without limitation, an identification of the object, a graphical indicator to use for the object, and other suitable information. These objects may be, for example, without limitation, aircraft, vehicles, missile sites, ships, missiles in flight, and other suitable objects.

Operation 1402 may be performed using a model for the sensor system. The model of the sensor system may include models of different sensors in the sensor system. Operation 1406 generates simulation sensor data in the same fashion that an actual sensor system would generate sensor data in an aircraft.

The sensor data is the same format as sensor data generated by physical sensor systems in the aircraft. A determination is then made as to whether the simulation data includes information about another unprocessed object (operation 1408). If the simulation data includes information about another unprocessed object, the unprocessed object is selected, and the process returns to operation 1402. Otherwise, the process terminates. The simulation sensor data may then be processed by the computer system in the aircraft in the same manner as with live sensor data generated by sensors for the aircraft.

Figure 15:
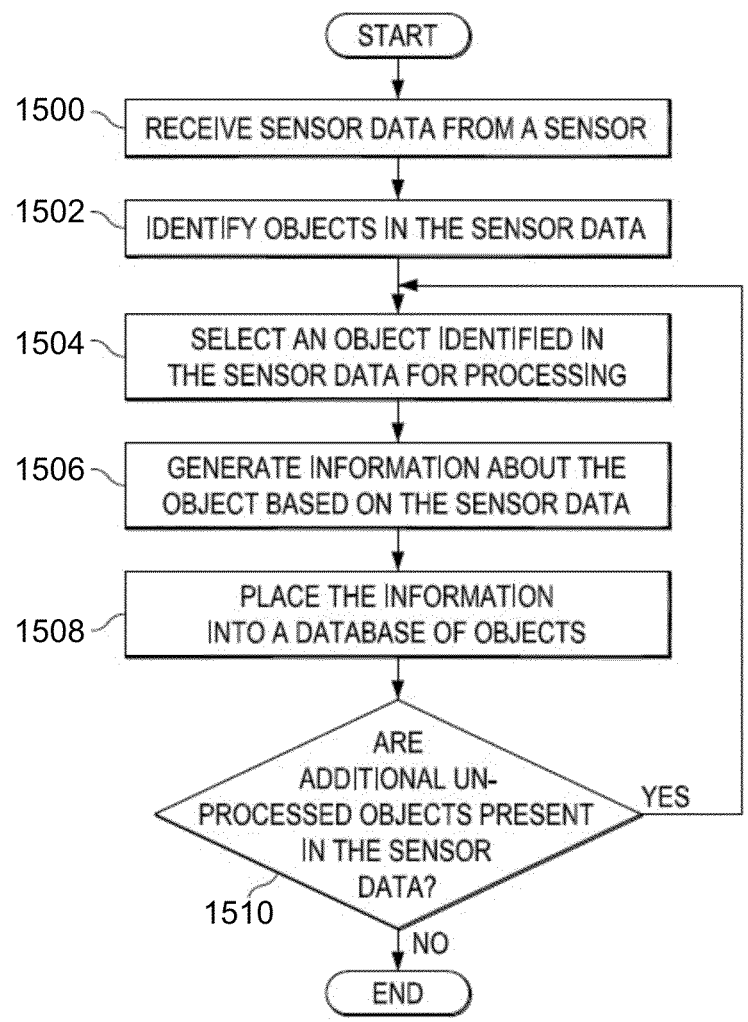
FIG. 15 is an illustration of a flowchart of a process for generating information about objects detected by sensors in accordance with an illustrative embodiment.

With reference now to FIG. 15, an illustration of a flowchart of a process for generating information about objects detected by sensors is depicted in accordance with an illustrative embodiment. The process illustrated in FIG. 15 may be implemented in software, such as training software 400 in FIG. 4. This process may be used to generate information about both live objects and simulation objects in these illustrative examples. The same process may be used, because the simulation sensor data is in the same format and contains the same type of information as the live sensor data generated by physical sensors in the aircraft. The operations illustrated in FIG. 15 may be used to generate data, such as live object data 446 and simulation object data 448 in FIG. 4.

The process begins by receiving sensor data from a sensor (operation 1500). In operation 1500, the sensor data may be either live sensor data or simulation sensor data in these examples. The process then identifies objects in the sensor data (operation 1502). An object identified in the sensor data is selected for processing (operation 1504). Information about the object is generated based on the sensor data (operation 1506). This information may include, for example, an identification of the object, a graphical indicator to use for the object, and other suitable information. Thereafter, the information is placed into a database of objects (operation 1508). Next, a determination is made as to whether additional unprocessed objects are present in the sensor data (operation 1510). If additional objects are present, the process returns to operation 1504. Otherwise, the process terminates.

With respect to simulation sensor data that may be received, the information about the object also may include an indication that the object is a simulation object rather than a live object. In some illustrative embodiments, parallel processes may run to process live sensor data and simulation sensor data. One process may process all live sensor data, while the other process processes only simulation sensor data. As a result, all of the objects identified by the process processing simulation sensor data are associated with objects that are simulation objects rather than live objects. The information for each type of object may be stored in separate locations such that an identification of a live object versus a simulation object may be made.

Figure 16:
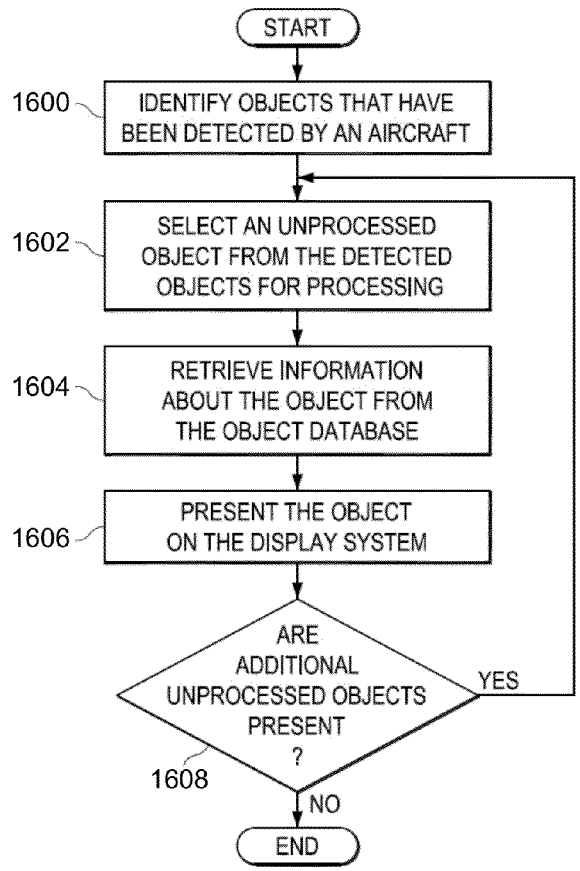
FIG. 16 is an illustration of a flowchart of a process for presenting object information in accordance with an illustrative embodiment.

With reference now to FIG. 16, an illustration of a flowchart of a process for presenting object information is depicted in accordance with an illustrative embodiment. The process illustrated in FIG. 16 may be used to process live object data and simulation object data generated by the process in FIG. 13.

The process begins by identifying objects that have been detected by an aircraft (operation 1600). These objects include ones detected by the sensors in the aircraft and those sent in simulation information to the aircraft. The identification may be made using an object database, such as object database 450 in FIG. 4.

Thereafter, the process selects an unprocessed object from the detected objects for processing (operation 1602). The process retrieves information about the object from the object database (operation 1604). This information may include, for example, without limitation, an identification of the object, a location of the object, and other suitable information. The process then presents the object on the display system (operation 1606). For example, a particular type of graphical indicator may be used, depending on the identification of the object type. For example, one type of graphical indicator may be used for friendly aircraft, while another type of graphical indicator may be used for enemy aircraft.

The display of graphical indicators may be presented on display system 438 using number of video display devices 439 in FIG. 4. Additionally, in some cases, the operator or operators in the aircraft may receive audio cues through devices, such as number of audio devices 440 in display system 438. In the different illustrative embodiments, these audio cues also may be generated based on the reception of simulation data 410.

Next, the process determines whether additional unprocessed objects are present (operation 1608). If additional unprocessed objects are present, the process returns to operation 1602. Otherwise, the process terminates.

In selecting an object for processing in the process in FIG. 16, all objects in the object database are identified and processed. The objects include those for objects actually detected by the aircraft and those sent in the simulation information. In this manner, the presentation of objects, both live and simulated, are presented on the display in the same manner in which live objects are normally presented on the display. Of course, the presentation of the display may include a different indicator for simulation objects as compared to live objects, depending on the particular implementation.

Figure 17:
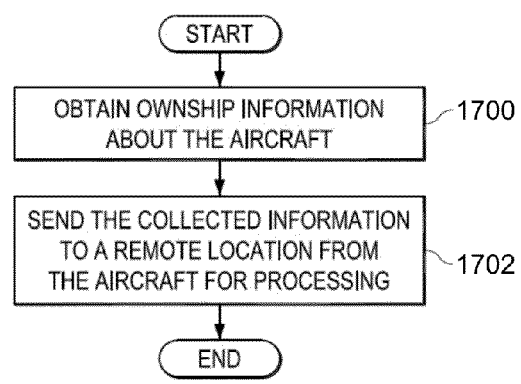
FIG. 17 is an illustration of a flowchart of a process for sending data during a training session in accordance with an illustrative embodiment.

With reference now to FIG. 17, an illustration of a flowchart of a process for sending data during a training session is depicted in accordance with an illustrative embodiment. The process illustrated in FIG. 17 may be implemented in a computer system, such as computer system 118 in aircraft 104 in FIG. 1.

The process begins by obtaining ownship information about the aircraft (operation 1700). This information may be obtained from a system, such as a global positioning system unit and/or an inertial navigation unit. This ownship information may include, for example, a longitude, a latitude, an elevation, an attitude, an altitude, a velocity, and other suitable information.

The ownship information also may include information about whether a control for launching a weapon has been activated. The process then sends the collected information to a remote location from the aircraft for processing (operation 1702), with the process terminating thereafter.

Figure 18:
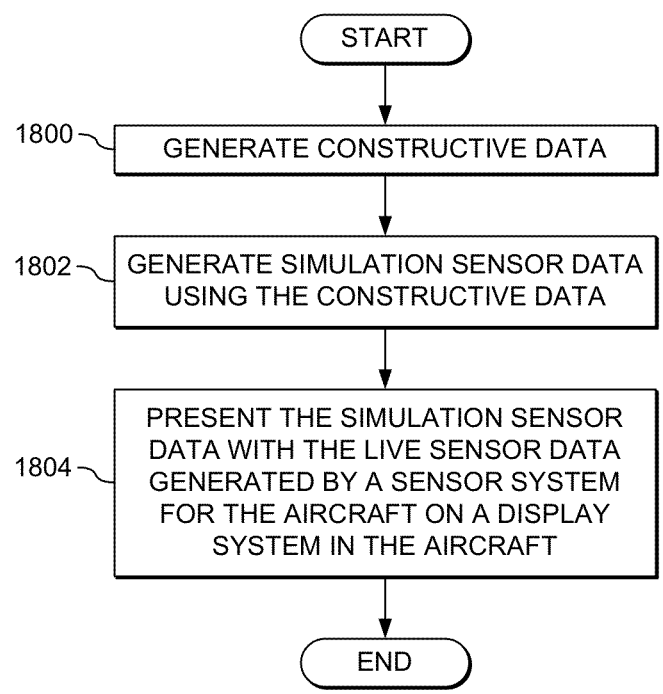
FIG. 18 is an illustration of a flowchart of a process for training in an aircraft in accordance with an illustrative embodiment.

With reference now to FIG. 18, an illustration of a flowchart of a process for training in an aircraft is depicted in accordance with an illustrative embodiment. The process illustrated in FIG. 18 may be implemented using training system 700 in FIG. 7. This process may be used to train crew 703 in aircraft 702.

The process begins by the training processor generating constructive data (operation 1800). The training processor then generates simulation sensor data using the constructive data (operation 1802).

The training processor then presents the simulation sensor data with the live sensor data generated by a sensor system for the aircraft on a display system in the aircraft (operation 1804) with the process terminating thereafter. In operation 1804, the training processor may send simulation sensor data without the live sensor data. The aircraft computer system may combine the simulation sensor data with the live sensor data for presentation.

Figure 19:
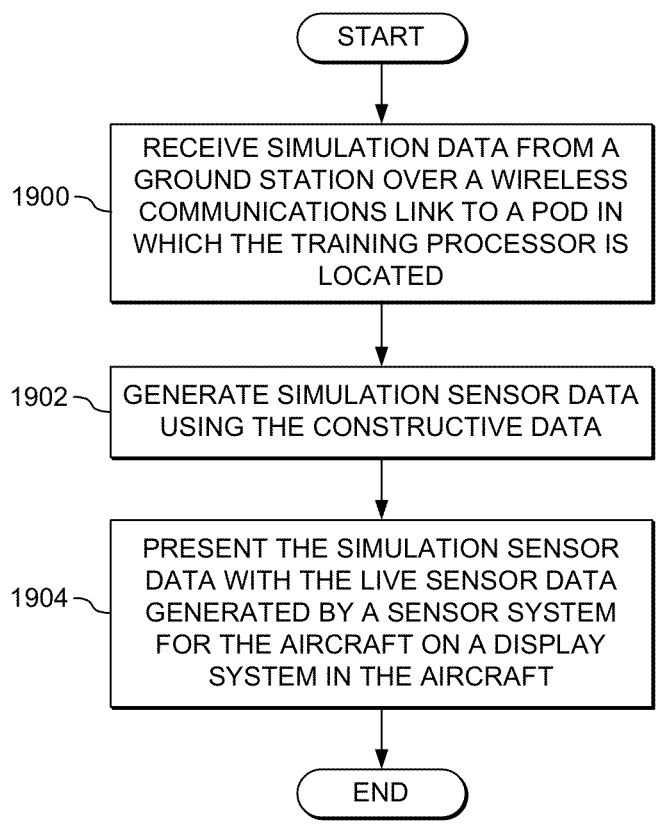
FIG. 19 is an illustration of a flowchart of a process for training in an aircraft with a training processor in accordance with an illustrative embodiment.

With reference now to FIG. 19, an illustration of a flowchart of a process for training in an aircraft with a training processor in accordance with an illustrative embodiment. The process illustrated in FIG. 19 may be implemented in training processor 720 located in pod 724 for training the crew of an aircraft.

The process begins by a training processor receiving simulation data from a ground station over a wireless communications link to a pod in which the training processor is located (operation 1900). This data may be received using network interface 733 and pod 724 in the illustrative examples. The simulation data may include at least one of constructive data and virtual data.

The training processor then generates simulation sensor data using the constructive data (operation 1902). The training processor then presents the simulation sensor data with the live sensor data generated by a sensor system for the aircraft on a display system in the aircraft (operation 1904), with the process terminating thereafter. The crew may train using the data presented on the display system of the aircraft.

The flowcharts and block diagrams in the different depicted embodiments illustrate the architecture, functionality, and operation of some possible implementations of apparatus and methods in different illustrative embodiments. In this regard, each block in the flowcharts or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different illustrative embodiments provide a method and apparatus for training with aircraft. In one illustrative embodiment, an apparatus comprises an aircraft. The apparatus also comprises a communications system, a display system, a sensor system, and a computer system, all of which are associated with the aircraft. The communications system is configured to exchange data with a number of remote locations using a wireless communications link. The computer system is configured to run a number of processes to receive simulation data received through the communications system over the wireless communications link, receive live data from the sensor system associated with the aircraft, and present the simulation data and the live data on the display system.

With one or more of the different illustrative embodiments, training using live aircraft may be reduced in expense and time. For example, with one or more of the different illustrative embodiments, multiple scenarios may be performed during a training session. For example, a first scenario may involve locating a ground target, and a second scenario may involve an air-to-air combat mission. These two scenarios may be performed during one training session more easily than with all live objects. For example, the scheduling and availability of aircraft and ground systems is less of a problem, because simulation objects may be used for one or more of the objects. Additionally, the amount of fuel and maintenance needed may be reduced because of the use of simulation objects in place of live objects.

The different illustrative embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer-readable or usable program code such that when the computer-readable or usable program code is executed on a computer, the execution of this computer-readable or usable program code causes the computer to transmit another computer-readable or usable program code over a communications link. This communications link may use a medium that is, for example, without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories, which provide temporary storage of at least some computer-readable or computer-usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different illustrative embodiments has been presented for purposes of illustration and description, and it is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. An apparatus comprising:
   an aircraft;
   a display system associated with the aircraft;
   a sensor system associated with the aircraft configured to generate live sensor data for aerial objects and ground objects;
   a training processor, connected to a weapons bus in the aircraft, and configured to:
     receive the live sensor data;
     generate constructive data for a number of simulation objects;
     generate simulation sensor data using the constructive data; and
     present the simulation sensor data with the live sensor data generated by the sensor system on the display system, wherein the training processor is configured for use in a removable pod connected externally to the aircraft, and wherein the apparatus is capable of operation while the aircraft is in flight.

2. The apparatus of claim 1 further comprising:
   a network interface associated with the aircraft, wherein the network interface is configured to exchange data using a wireless communications link, wherein the training processor receives virtual data using the wireless communications link.

3. The apparatus of claim 2, wherein the training processor generates the simulation sensor data using the constructive data and the virtual data.

4. The apparatus of claim 1, wherein the training processor is configured to receive the live sensor data from the sensor system associated with the aircraft.

5. The apparatus of claim 1, wherein the training processor comprises:
   a housing;
   a number of processor units; and
   program code configured to run on the number of processor units to generate the constructive data for the number of simulation objects; generate the simulation sensor data using the constructive data; and present the simulation sensor data with the live sensor data generated by the sensor system on the display system.

6. The apparatus of claim 5, wherein the number of processor units are configured to provide a number of levels of security.

7. The apparatus of claim 5, wherein responsive to a processor unit running a process in the number of processor units failing to operate as desired, a portion of other processor units in the number of processor units running the processes for the processor unit failing to operate as desired.

8. The apparatus of claim 1, wherein the training processor is configured to operate in an untethered mode in which the constructive data is generated internally.

9. The apparatus of claim 1, wherein the training processor is configured to generate sounds that simulate at least one of sensor sounds and weapon sounds.

10. The apparatus of claim 1, wherein the training processor is configured to generate video data for a number of simulated objects.

11. The apparatus of claim 1, wherein the training processor is configured to provide audio communications with a number of training devices in the form of a number of flight simulators over a wireless communications link.

12. A training system comprising:
a training processor, connected to a weapons bus in an aircraft, configured to:
receive live sensor data from the aircraft for aerial objects and ground objects;
receive ownship data from the aircraft from controls and a navigation system of the aircraft;
generate constructive data for a number of simulation objects;
generate simulation sensor data using the constructive data; and
present the simulation sensor data with live sensor data generated by a sensor system for the aircraft on a display system in the aircraft, wherein the training processor is configured for use in a removable pod connected externally to the aircraft, and wherein the system is capable of operation while the aircraft is in flight.

13. A method for training in an aircraft, the method comprising:
providing to a training processor live sensor data from the aircraft for aerial objects and ground objects, the live sensor data generated by a sensor system for the aircraft;
providing to the training processor ownship data from the aircraft from controls and a navigation system of the aircraft;
generating, by the training processor, constructive data;
generating, by the training processor, simulation sensor data using the constructive data; and
presenting the simulation sensor data with the live sensor on a display system in the aircraft;
wherein the training processor is connected to a weapons bus in the aircraft, and the training processor is configured for use in a removable pod connected externally to the aircraft, and wherein the method is capable of operation while the aircraft is in flight.

14. The method of claim 13 further comprising:
receiving, by the training processor, virtual data over a wireless communications link to a network interface in the aircraft.

15. The method of claim 14, wherein generating, by the training processor, the simulation sensor data using the constructive data comprises:
generating, by the training processor, the simulation sensor data using the constructive data and the virtual data.

16. The method of claim 13 further comprising:
generating, by the training processor, sounds that simulate at least one of sensor sounds and weapon sounds.

17. The method of claim 13 further comprising:
generating, by the training processor, video data for a number of simulated objects for display on the display system in the aircraft.

18. The method of claim 13 further comprising:
providing, by the training processor, audio communications with a number of training devices over a wireless communications link.

* * * * *